(12) United States Patent
Seshadri

(10) Patent No.: US 11,223,846 B1
(45) Date of Patent: Jan. 11, 2022

(54) COMPLEXITY-BASED MOTION SEARCH FOR VIDEO ENCODER

(71) Applicant: Amazon Technologies, Inc., Seattle, WA (US)

(72) Inventor: Kiran K Seshadri, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/703,445

(22) Filed: Dec. 4, 2019

(51) Int. Cl.
| | |
|---|---|
| *H04N 19/56* | (2014.01) |
| *H04N 19/115* | (2014.01) |
| *H04N 19/14* | (2014.01) |
| *H04N 19/176* | (2014.01) |

(52) U.S. Cl.
CPC .......... *H04N 19/56* (2014.11); *H04N 19/115* (2014.11); *H04N 19/14* (2014.11); *H04N 19/176* (2014.11)

(58) Field of Classification Search
None
See application file for complete search history.

(56) References Cited

U.S. PATENT DOCUMENTS

| | | | | |
|---|---|---|---|---|
| 2008/0126278 | A1* | 5/2008 | Bronstein | H04N 19/61 706/17 |
| 2015/0326871 | A1* | 11/2015 | Sezer | H04N 19/14 375/240.18 |
| 2019/0045210 | A1* | 2/2019 | Guermazi | H04N 19/176 |
| 2020/0029077 | A1* | 1/2020 | Lee | H04N 19/157 |
| 2020/0404284 | A1* | 12/2020 | Chen | H04N 19/132 |

OTHER PUBLICATIONS

J. Zhu, Z. Liu and D. Wang, "Fully pipelined DCT/IDCT/Hadamard unified transform architecture for HEVC Codec," *2013 IEEE International Symposium on Circuits and Systems(ISCAS2013)*, Beijing, 2013, pp. 677-680.

S. Shen, W. Shen, Y. Fan and X. Zeng, "A Unified 4/8/16/32-Point Integer IDCT Architecture for Multiple Video Coding Standards," *2012 IEEE International Conference on Multimedia and Expo*, Melbourne, VIC, 2012, pp. 788-793.

\* cited by examiner

*Primary Examiner* — Samuel D Fereja
(74) *Attorney, Agent, or Firm* — Weaver Austin Villeneuve & Sampson LLP

(57) ABSTRACT

Methods and hardware implementations for performing a motion search based on an estimated complexity of a block. The block is obtained from a first frame. A reference window is obtained from a second frame. For each partition type of N partition types, the block is partitioned into a plurality of partitioned blocks in accordance with the partition type. For each partitioned block of the plurality of partitioned blocks, a frequency transform of the partitioned block is computed, a complexity subvalue is computed for the partitioned block based on the frequency transform, and the complexity subvalue is accumulated into a complexity value for the partition type. M partition types are selected from the N partition types based on the N complexity values. A motion vector between the block and the reference window is determined for each partition type of the M partition types.

16 Claims, 19 Drawing Sheets

| Clock | From SRAM Window Line | LOC0 Window Line | LOC1/LOC2 Window Line | LOC3/LOC4/LOC5 Window Line | LOC6/LOC7 Window Line | LOC8 Window Line | From SRAM MBlk Line | LOC0 MBlk Line | LOC1/LOC2 MBlk Line | LOC3/LOC4/LOC5 MBlk Line | LOC6/LOC7 MBlk Line | LOC8 MBlk Line |
|---|---|---|---|---|---|---|---|---|---|---|---|---|
| 0  | 0  | 0  |    |    |    |    | 0  | 0  |    |    |    |    |
| 1  | 1  | 1  | 1  |    |    |    | 1  | 1  | 0  |    |    |    |
| 2  | 2  | 2  | 2  | 2  |    |    | 2  | 2  | 1  | 0  |    |    |
| 3  | 3  | 3  | 3  | 3  | 3  |    | 3  | 3  | 2  | 1  | 0  |    |
| 4  | 4  | 4  | 4  | 4  | 4  | 4  | 4  | 4  | 3  | 2  | 1  | 0  |
| 5  | 5  | 5  | 5  | 5  | 5  | 5  | 5  | 5  | 4  | 3  | 2  | 1  |
| 6  | 6  | 6  | 6  | 6  | 6  | 6  | 6  | 6  | 5  | 4  | 3  | 2  |
| 7  | 7  | 7  | 7  | 7  | 7  | 7  | 7  | 7  | 6  | 5  | 4  | 3  |
| 8  | 8  | 8  | 8  | 8  | 8  | 8  | 8  | 8  | 7  | 6  | 5  | 4  |
| 9  | 9  | 9  | 9  | 9  | 9  | 9  | 9  | 9  | 8  | 7  | 6  | 5  |
| 10 | 10 | 10 | 10 | 10 | 10 | 10 | 10 | 10 | 9  | 8  | 7  | 6  |
| 11 | 11 | 11 | 11 | 11 | 11 | 11 | 11 | 11 | 10 | 9  | 8  | 7  |
| 12 | 12 | 12 | 12 | 12 | 12 | 12 | 12 | 12 | 11 | 10 | 9  | 8  |
| 13 | 13 | 13 | 13 | 13 | 13 | 13 | 13 | 13 | 12 | 11 | 10 | 9  |
| 14 | 14 | 14 | 14 | 14 | 14 | 14 | 14 | 14 | 13 | 12 | 11 | 10 |
| 15 | 15 | 15 | 15 | 15 | 15 | 15 | 15 | 15 | 14 | 13 | 12 | 11 |
| 16 | 16 |    | 16 | 16 | 16 | 16 |    |    | 15 | 14 | 13 | 12 |
| 17 | 17 |    |    | 17 | 17 | 17 |    |    |    | 15 | 14 | 13 |
| 18 | 18 |    |    |    | 18 | 18 |    |    |    |    | 15 | 14 |
| 19 | 19 |    |    |    |    | 19 |    |    |    |    |    | 15 |

Table 700

FIG. 7

COMPLEXITY-BASED MOTION SEARCH FOR VIDEO ENCODER

BACKGROUND

Digital video compression aims to reduce the amount of data used to represent the digital frames that comprise a video. Digital video compression plays an important role in many multimedia applications, in which both the user's demands (high-quality moving images delivered quickly at a reasonable cost) and the limited capabilities of storage devices and transmission networks must be satisfied. At the core of each of these applications is the video compressor and decompressor, alternatively referred to as the video enCOder and DECoder, or CODEC. Many video codecs are based on the removal of redundancy in the original video. The redundancy may be a spatial redundancy (e.g., areas of the video frames that vary by small amounts), a temporal redundancy (e.g., similarity between successive video frames), or a source coding redundancy (e.g., symbols produced by the video codec are inefficiently mapped to a binary bit stream).

One technique for reducing spatial redundancy is to determine a motion vector between successive frames so as to represent the second frame as the combination of the first frame and the motion vector. The motion vector may relate to the whole image or to specific portions, such as rectangular blocks or arbitrary shaped segments. For example, the first frame may be divided into multiple sections, and a different motion vector may be determined for each of the sections. Motion estimation is a key part of many popular video coding standards, such as the Moving Picture Experts Group (MPEG) and High Efficiency Video Coding (HEVC) standard.

BRIEF DESCRIPTION OF THE DRAWINGS

Various embodiments in accordance with the present disclosure will be described with reference to the drawings, in which:

FIG. 7 illustrates a table showing the order of reference window lines and macroblock lines being sent to accumulators.

DETAILED DESCRIPTION

Figure 1:
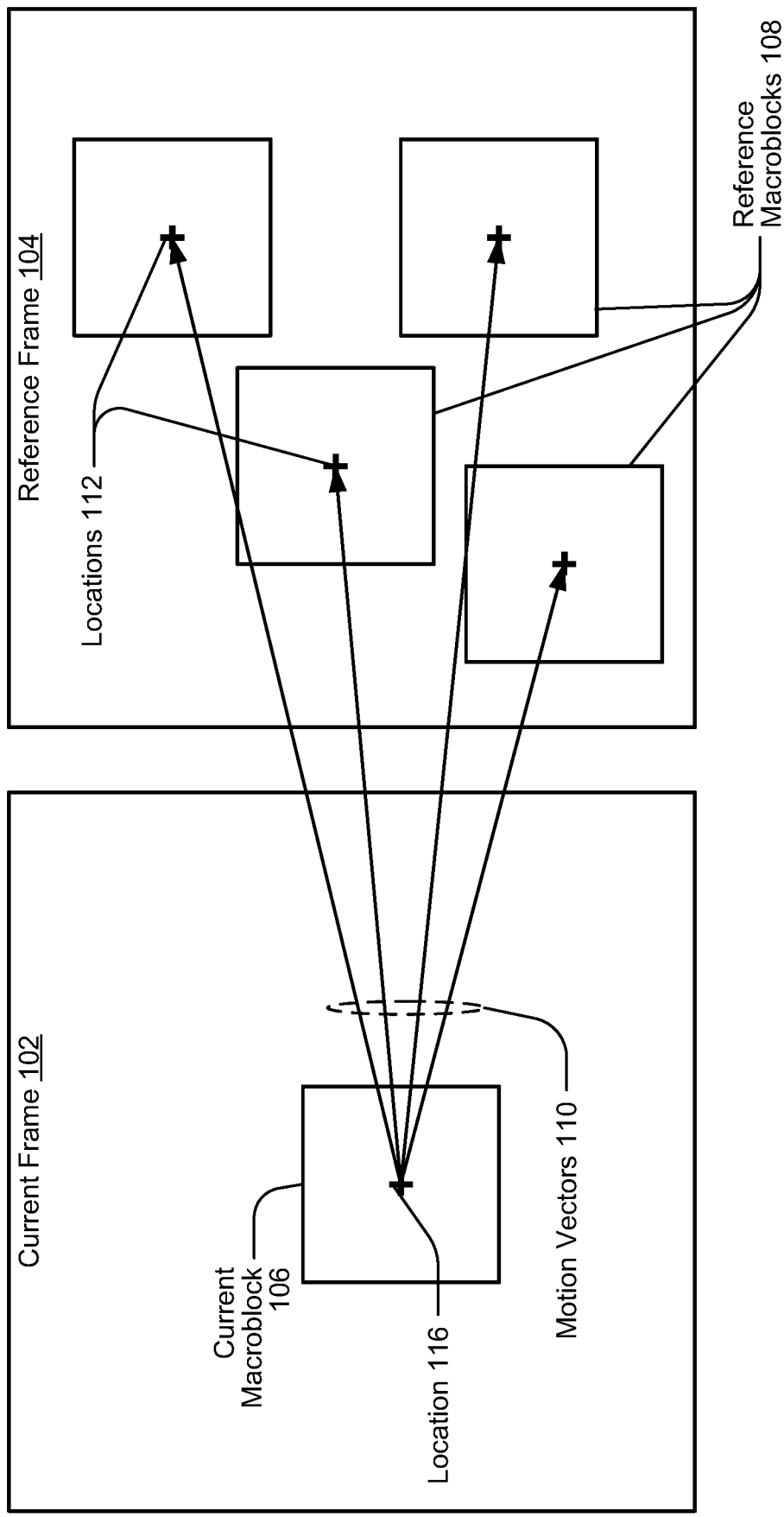
FIG. 1 illustrates an example of a motion search between a current frame and a reference frame.

Motion search or estimation is the task of determining a motion vector between two two-dimensional (2D) images, which may be referred to as a current frame and a reference frame. In some instances, a current macroblock is defined within the current frame and a reference macroblock that is a best match to the current macroblock is searched for in the reference frame. The outputs of the motion search include the motion vector and the prediction error, which is the difference between the pixels of the current macroblock of the current frame and the reference macroblock of the reference frame. While various metrics can be used for the prediction error, one common approach is to use the Sum of Absolute Differences (SAD), which is computed by taking the absolute differences between corresponding pixels, and summing across the computed differences.

During a motion search, multiple locations may be concurrently or sequentially searched in the reference frame to find the motion vector with the lowest prediction error. The greater the number of locations that are searched, the higher the probability of finding a better match and hence a better compression efficiency. The locations that are searched may be represented as $(X_1, Y_1), (X_2, Y_2), (X_3, Y_3), (X_N, Y_N)$, where N is the number of locations searched. For each location LOC(i), the corresponding SAD(i) may be computed as follows:

$$SAD(i) = \sum_{x=0}^{15} \sum_{y=0}^{15} |A(x, y) - P(X_i + x, Y_i + y)|$$

where A is the pixels of the macroblock of the current frame and P is the pixels of the reference frame. While the above SAD equation is for a 16×16 macroblock size, other sizes and shapes of macroblocks may be used.

The locations that are searched may be determined by a particular search pattern that is employed. In one example, the search pattern is a 3×3 grid of locations arranged in 3 rows and 3 columns. In another example, the search pattern has a diamond shape with locations arranged in 5 rows. At each iteration of the motion search, the SAD may be computed at each of the locations in the search pattern, and the location corresponding to the lowest SAD may be identified. After the lowest SAD value is found during a particular iteration, a subsequent iteration of the motion search may be initiated with the search pattern centered at the location corresponding to the lowest SAD value, thereby causing the motion sensor to gravitate across the reference window toward the best location. In some instances, the search pattern may be modified during different iterations. For example, the search pattern may tighten (e.g., smaller spacings between adjacent locations) during later iterations so as to fine tune the search process. The number of iterations may depend on the desired accuracy of the motion search.

In many cases, the compression efficiency can be improved if a macroblock (or any prediction unit) is predicted in the reference frame using different partition types. A prediction unit's partition types are the several ways of partitioning (e.g., dividing up) the prediction unit into partitioned blocks. For example, in an H264 video encoder, a 16×16 macroblock can be predicted using 16×16, 8×16, 16×8, 8×8, 8×4, 4×8, and 4×4 partition types. While smaller partition types can result in lower prediction errors, they come with increased complexity. During a motion search, the searches are generally performed using all of these partition types, and often are ran independently for each partition. For example, when a motion search is attempting to predict a 16×16 macroblock using a 16×16 partition type, the prediction unit will contain only 1 partitioned block and therefore only 1 search has to be performed. If instead the motion search is attempting to predict a 16×16 macroblock using an 8×8 partition type, the prediction unit will contain 4 partitioned blocks and therefore 4 searches have to be performed. For each partitioned block, the SAD value may be computed at each location of a search pattern.

Implementing the motion search in hardware is a challenge from a latency point of view. For each location being searched, a subtraction and an accumulate has to be performed for each pixel of the macroblock (and/or the partitioned block). For example, a 16×16 macroblock size requires 256 subtractions and 256 accumulate operations. While each iteration may need to be processed sequentially by the hardware, in many cases a hardware implementation will require that each location may be processed sequentially during each iteration. Retrieving the needed pixels for the macroblock and the reference window from memory for each iteration/location also leads to significant delay in the computation time.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

In some embodiments of the present disclosure, systems, methods, and other techniques are provided for performing a low-latency motion search in which the SAD computations for all locations are performed in parallel for each iteration. On-chip memory devices, such as static random access memory (SRAM) devices, may be used to store the lines/pixels from the macroblock and/or the reference window. In some examples, the macroblock lines and the reference window lines are read from an external memory and stored in the on-chip SRAM. During different clock cycles, particular pixels from one or more of the lines may be read from the on-chip SRAM to be processed by various accumulators.

One SAD accumulator may be employed for each location of the motion search. Each accumulator may receive the reference line and the current macroblock line and compute a portion of the prediction error by taking the absolute difference between corresponding pixels in the lines. As additional lines are fed into each accumulator, any newly computed SAD values are added to a running total that includes the sum of all previously-computed SAD values. Once all of the reference lines and current macroblock lines have been fed into a particular accumulator, the accumulator passes its final SAD value to a comparator to be compared with other final SAD values computed by other accumulators.

Because the accumulators are accumulating in parallel and SADs for multiple pixels are computed and accumulated in parallel, the latency of the system, in at least some cases, only depends on the access latency from the SRAMs and the latency of the accumulation and comparison pipelines. A significant benefit of this system is that the latency does not depend on the number of locations being checked. If additional locations need to be checked, the system can easily be scaled with additional accumulators (for the added locations) and additional delay stages for the macroblock lines.

In some embodiments of the present disclosure, systems, methods, and other techniques are provided for selecting one or more partition types based on the macroblock complexity. Such embodiments take advantage of the fact that, in temporal or spatial prediction, the choice of partition type for a macroblock generally depends on the complexity (the amount of fine detail) of the macroblock. For example, when the macroblock includes more fine details, a smaller partition type (e.g., 8×8 or smaller) can lead to superior performance, whereas a larger partition type (e.g., 16×16, 8×16, 16×8) can lead to superior performance when the macroblock has less complexity.

As such, by estimating the complexity of the macroblock prior to searching, the types of partition types that are searched can be narrowed, thereby reducing the overall computation cost for the motion search per macroblock, which in turn increases throughput and frees up resources. The estimated complexity can be used to inform the motion search by selecting only the partition types that have the lowest complexities to go through the motion search.

FIG. 1 illustrates an example of a motion search between a current frame 102 and a reference frame 104. Current frame 102 and reference frame 104 may be adjacent or non-adjacent frames of a digital video. In some embodiments, a current macroblock 106 may be defined within current frame 102 in reference to (e.g., at or surrounding) a particular location 116 in current frame 102. For example, location 116 may be at the center, edge, or corner of current macroblock 106. Current macroblock 106 may be rectangular (e.g., square) or any arbitrary shape. Current macroblock 106 may represent the portion of current frame 102 that is to be encoded through a motion search process.

During the motion search, N locations 112 may be searched in reference frame 104. Locations 112 may be randomly selected or may be selected in accordance with a search pattern. At each of locations 112, one of N reference macroblocks 108 may be defined in reference frame 104. For example, locations 112 may be at the center, edge, or corner of reference macroblocks 108. Reference macroblocks 108 may be identical in size and shape to current macroblock 106 so that pixel-wise computations may be performed.

Locations 112 may be related to location 116 through N motion vectors 110. While motion vectors 110 are illustrated in FIG. 1 as extending left-to-right from current frame 102 to reference frame 104 for purposes of clarity, motion vectors 110 correspond to the two-dimensional (2D) displacement when reference frame 104 is superimposed onto current frame 102. As such, motion vectors 110 may take on values of X between −W and +W (where W is the width of current frame 102) and values of Y between −H and +H (where H is the height of current frame 102). Accordingly, one of motion vectors 110 may have values of (X=0, Y=0), corresponding to a location in reference frame 104 that is aligned with location 116. As a result of the motion search, one of reference macroblocks 108 may be determined to have a lowest SAD with current macroblock 106, and the corresponding location 112 and motion vector 110 may be identified and used for data compression.

Figure 2:
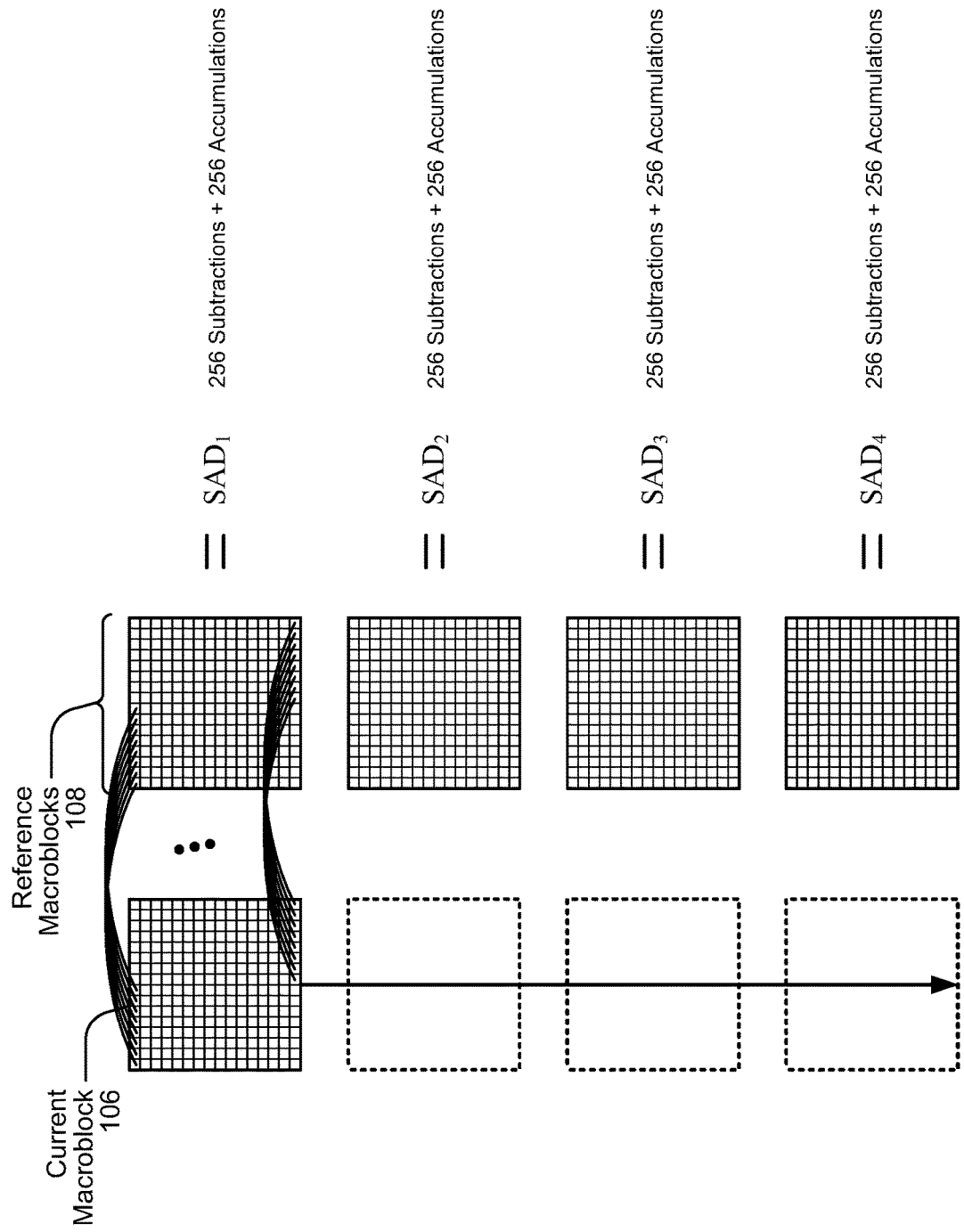
FIG. 2 illustrates an example of computations performed in implementing a motion search.

FIG. 2 illustrates an example of the computations that are performed in implementing the motion search shown in FIG. 1. For each of locations 112, the SAD is computed based on current macroblock 106 and the corresponding reference macroblock 108. For a 16×16 macroblock size, the SAD is computed using 256 subtractions between corresponding pixels and 256 accumulate operations performed on the results of the 256 subtractions. Since current macroblock 106 is used in the computation of each of the SADs, portions (e.g., pixels/lines) of current macroblock 106 need only be retrieved a single time from memory for a single iteration.

Figure 3:
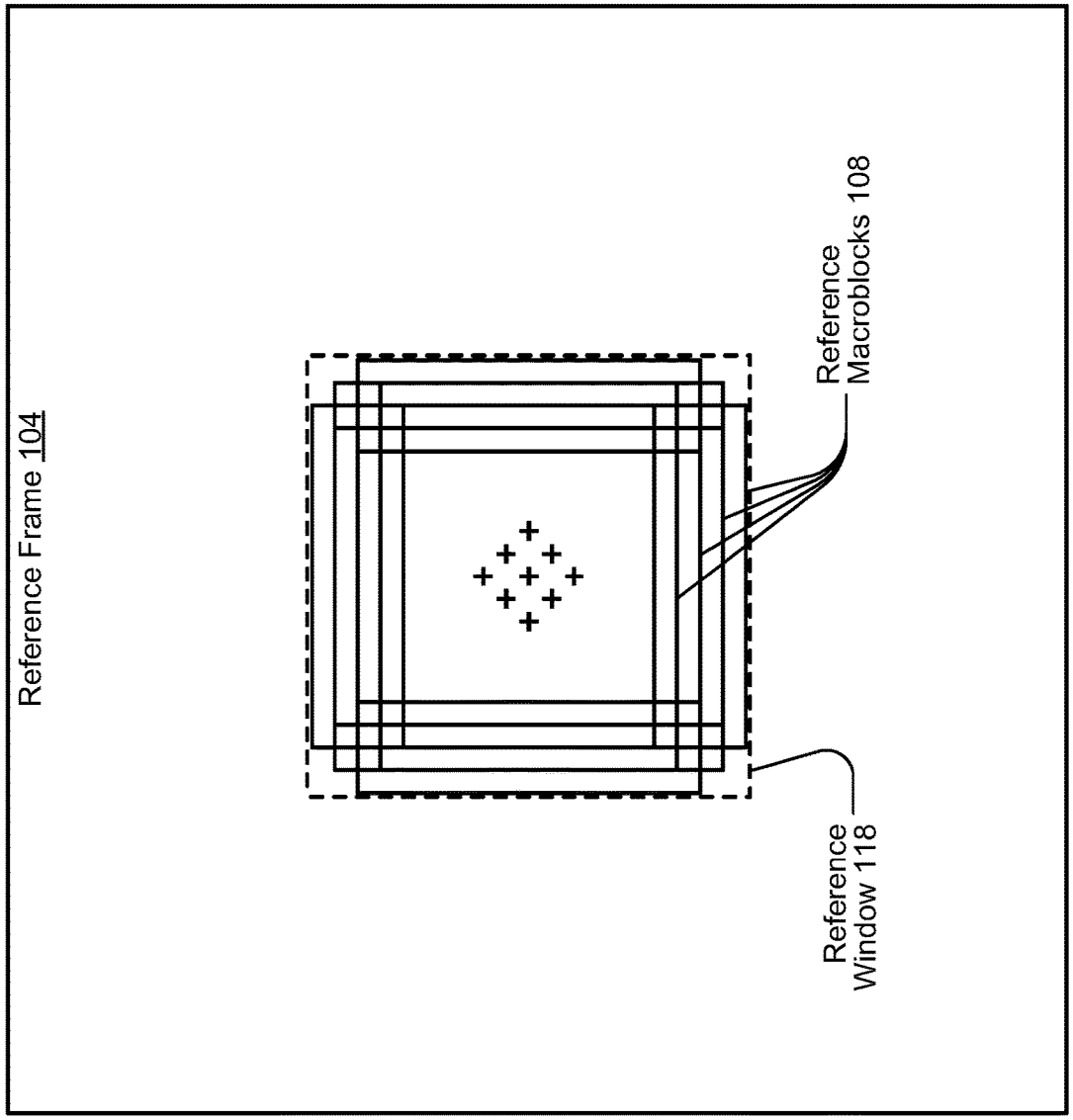
FIG. 3 illustrates an example of a reference window that may be defined within a reference frame.

FIG. 3 illustrates an example of a reference window 118 that may be defined within reference frame 104. Reference window 118 may be defined as the pixels of reference frame 104 that are included in at least one of reference macroblocks 108. As such, reference window 118 may be larger or smaller based on the search pattern employed as well as the size and shape of current macroblock 106. In some embodiments, reference window 118 may include additional pixels that are not included in any of reference macroblocks 108 such that reference window 118 has a particular shape. For example, in the illustrated embodiment, reference window 118 may include additional pixels in each of its corners that are not included in any of reference macroblocks 108 to allow reference window 118 to have a rectangular shape.

Figure 4A:
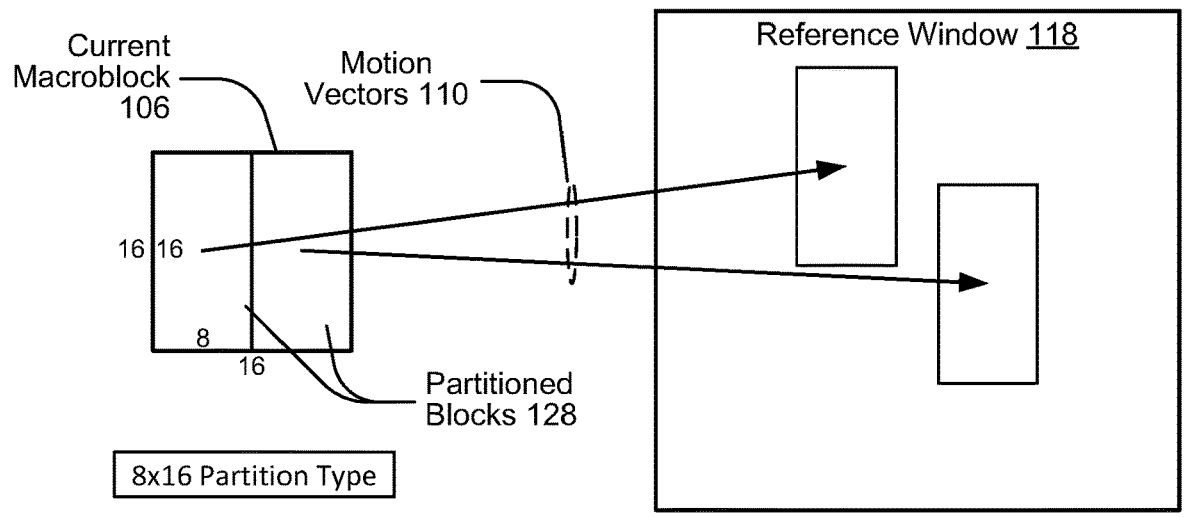
FIGS. 4A-4F illustrate various examples of partition types that may be employed during a motion search.
Figure 4B:
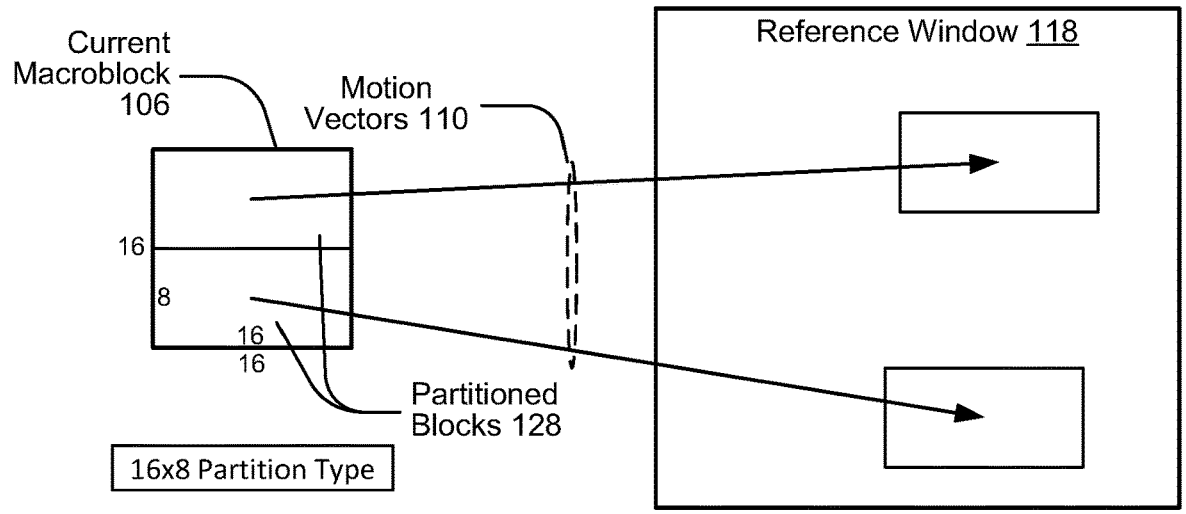
Figure 4C:
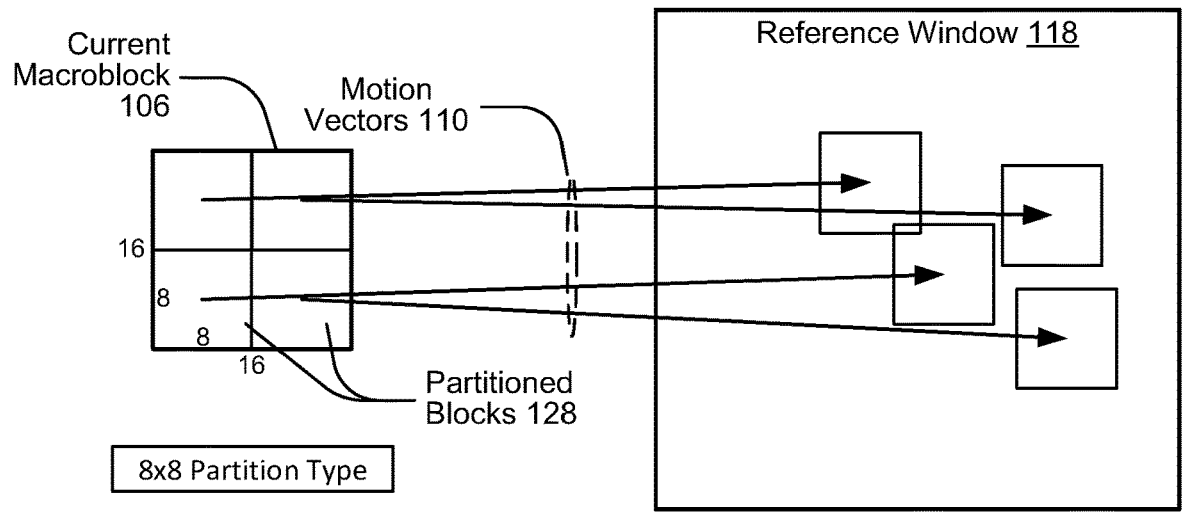

FIGS. 4A-4F illustrate various examples of partition types that may be employed during a motion search. FIG. 4A illustrates an example motion search using an 8×16 partition type. Current macroblock 106 is partitioned into 2 partitioned blocks 128, which are searched for in reference window 118, resulting in 2 motion vectors 110. FIG. 4B illustrates an example motion search using a 16×8 partition type. Similarly, current macroblock 106 is partitioned into 2 partitioned blocks 128, which are searched for in reference window 118, resulting in 2 motion vectors 110. FIG. 4C illustrates an example motion search using an 8×8 partition type. Current macroblock 106 is partitioned into 4 partitioned blocks 128, which are searched for in reference window 118, resulting in 4 motion vectors 110.

Figure 4D:
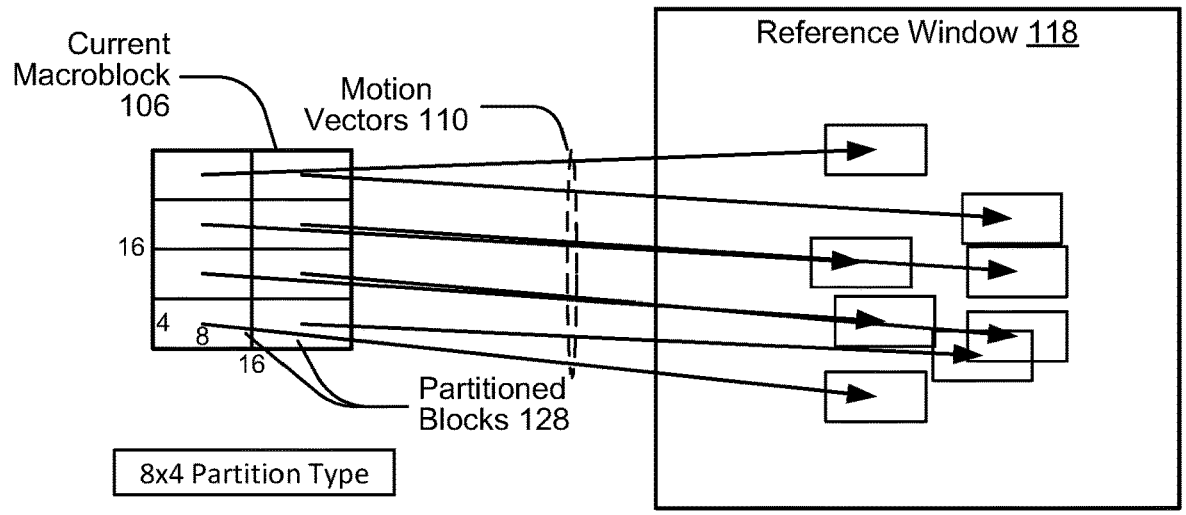
Figure 4E:
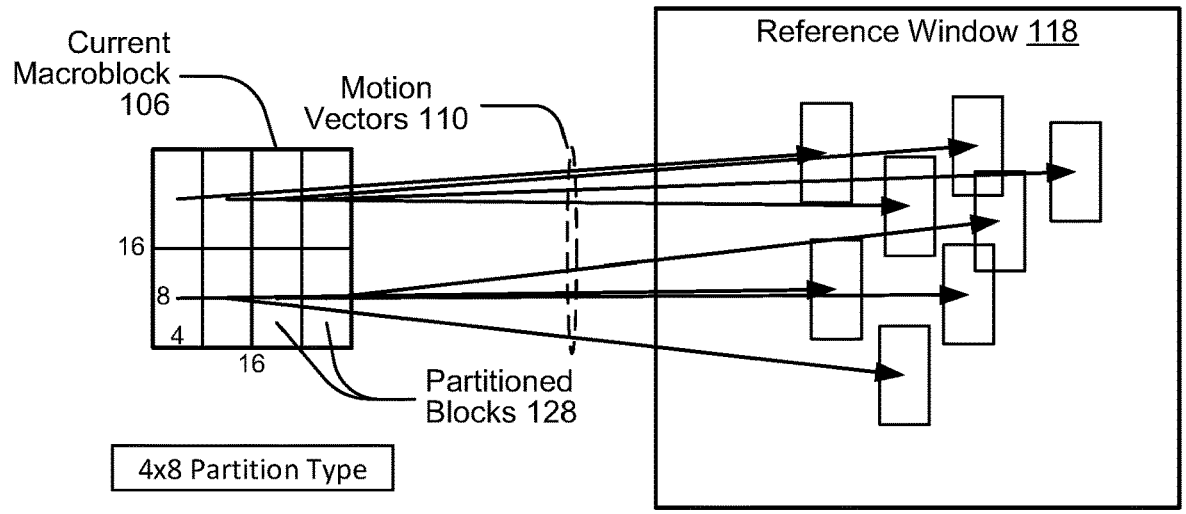
Figure 4F:
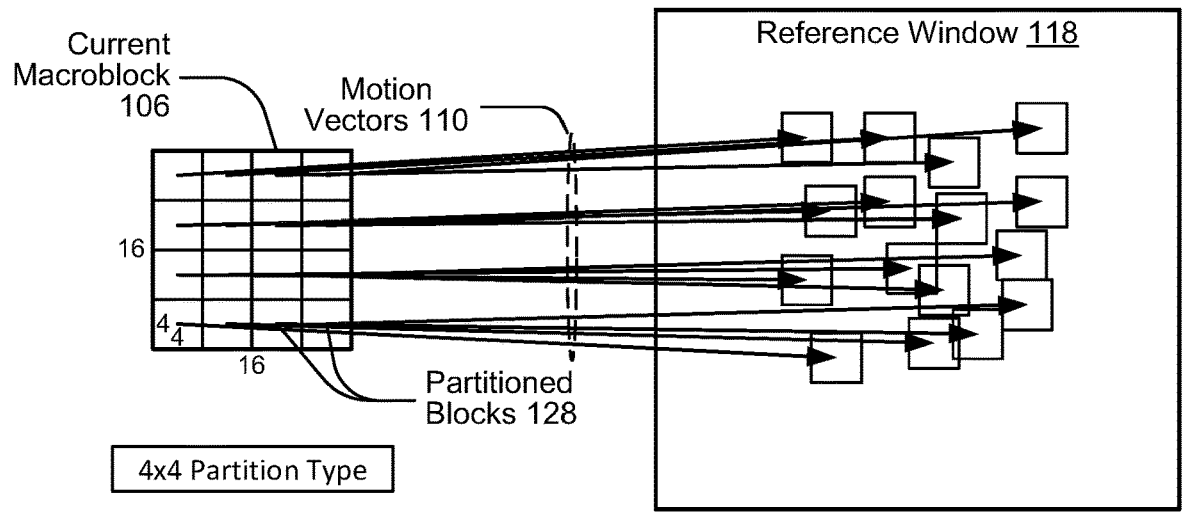

FIG. 4D illustrates an example motion search using an 8×4 partition type. Current macroblock 106 is partitioned into 8 partitioned blocks 128, which are searched for in reference window 118, resulting in 8 motion vectors 110. FIG. 4E illustrates an example motion search using a 4×8 partition type. Similarly, current macroblock 106 is partitioned into 8 partitioned blocks 128, which are searched for in reference window 118, resulting in 8 motion vectors 110. FIG. 4F illustrates an example motion search using a 4×4 partition type. Current macroblock 106 is partitioned into 16 partitioned blocks 128, which are searched for in reference window 118, resulting in 16 motion vectors 110.

Figure 5A:
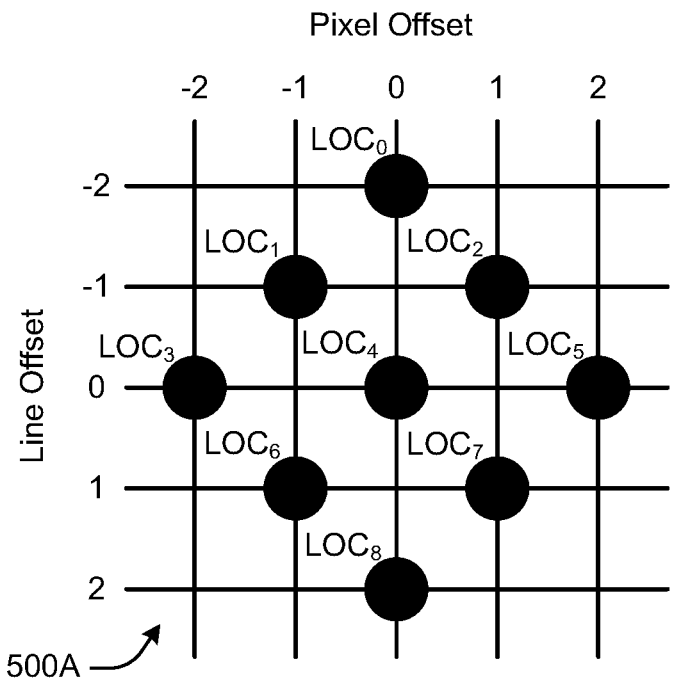
FIGS. 5A-5D illustrate various examples of search patterns that may be employed to perform a motion search.
Figure 5B:
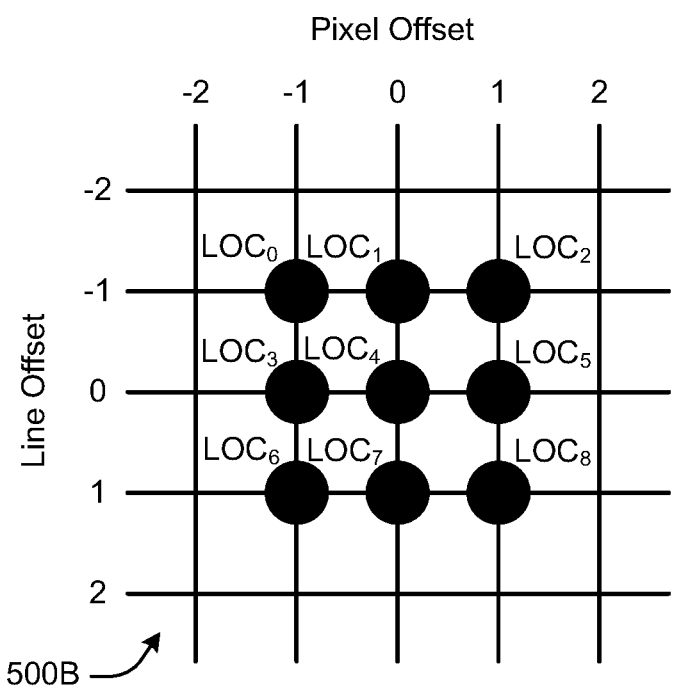
Figure 5C:
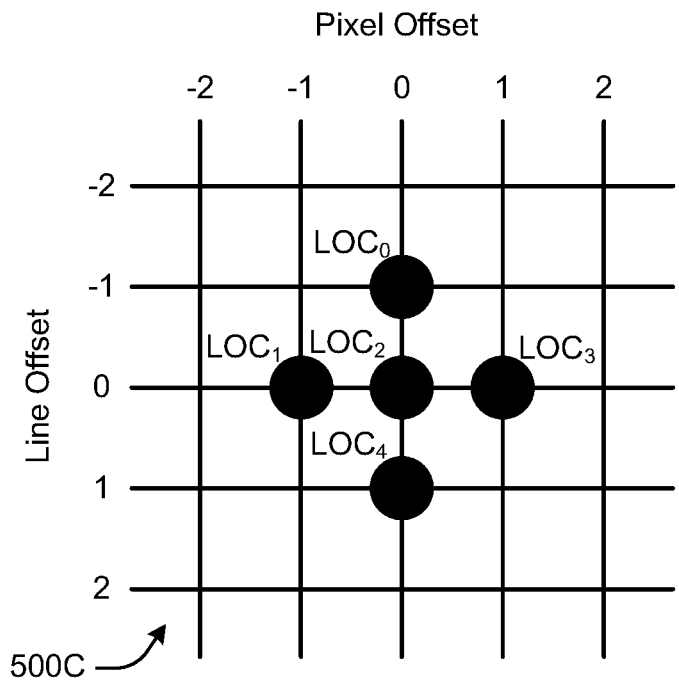
Figure 5D:
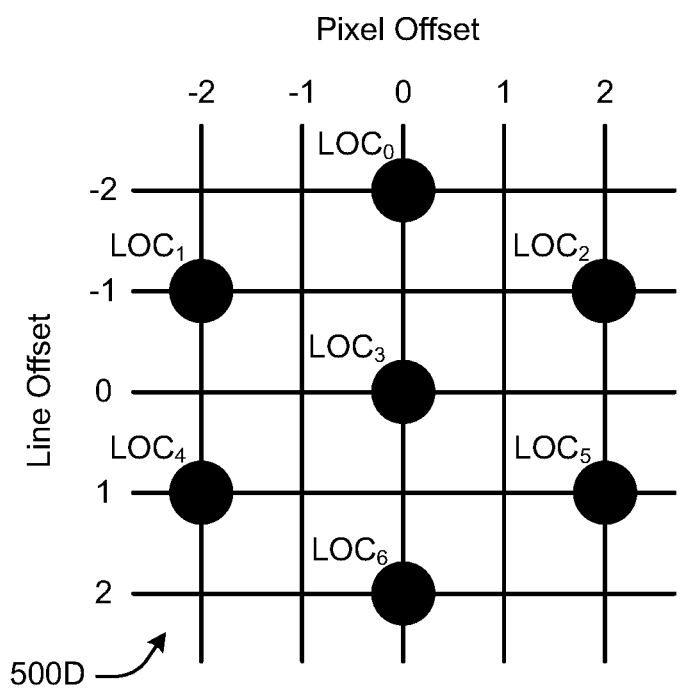

FIGS. 5A-5D illustrate various examples of search patterns 500 that may be employed to perform a motion search. Locations are labeled as $LOC_0$, $LOC_1$, $LOC_2$, $LOC_3$, ... $LOC_N$, and are defined in terms of pixel offsets (in the X axis) and line offsets (in the Y axis) between location 116 in current frame 102 and locations 112 in reference frame 104. FIG. 5A illustrates an example of a search pattern 500A having a diamond shape with locations arranged in 5 rows and 5 columns. FIG. 5B illustrates an example of a search pattern 500B having a rectangular shape with locations arranged in 3 rows and 3 columns. FIG. 5C illustrates an example of a search pattern 500C having a diamond shape with locations arranged in 3 rows and 3 columns. FIG. 5D illustrates an example of a search pattern 500D having a hexagonal shape with locations arranged in 5 rows and 3 columns.

The illustrated search patterns offer various tradeoffs between speed and accuracy. For example, search patterns that are more spread out, such as those illustrated in FIGS. 5A and 5D, may move more quickly over multiple iterations toward the area of reference frame 104 where the lowest SAD value is found. In contrast, search patterns that are less spread, such as those illustrated in FIGS. 5B and 5C, may move more slowly toward the area of reference frame 104 where the lowest SAD value is found but may be more accurate when converging to a final location.

FIGS. 6A-6D illustrate various examples of hardware implementations for performing motion searches and determining motion vectors using the search patterns illustrated in FIGS. 5A-5D, respectively. In each of the hardware implementations, reference window 118 is retrieved from an external memory 602 via an external memory interface 604 and is stored on a memory device 606. Similarly, current macroblock 106 is retrieved from external memory 602 via external memory interface 604 and is stored on a memory device 608. Memory devices 606 and 608 may be the same or different memory devices and, in some embodiments, may be on-chip SRAM device(s). Reference window lines 612 from reference window 118 are fed into multiple pixel selectors 616 that select relevant pixels from reference window lines 612 based on the clock cycle and the location of the search pattern that the pixel selector is assigned. The relevant pixels are fed into multiple accumulators 618 that also receive a macroblock line 614.

Macroblock line 614 is clock delayed by a set of delay elements 620 such that various delayed versions of macroblock line 614 may be fed into different accumulators 618. Accumulators 618 compute a SAD value for the lines received at a particular clock cycle, and add the computed SAD value to a running total SAD value, thereby accumulating all SAD values. Once all of the reference lines and macroblock lines have been fed into a particular SAD accumulator, the SAD accumulator passes its final SAD value to a comparator 622 to be compared with other final SAD values computed by the other SAD accumulators.

Figure 6A:
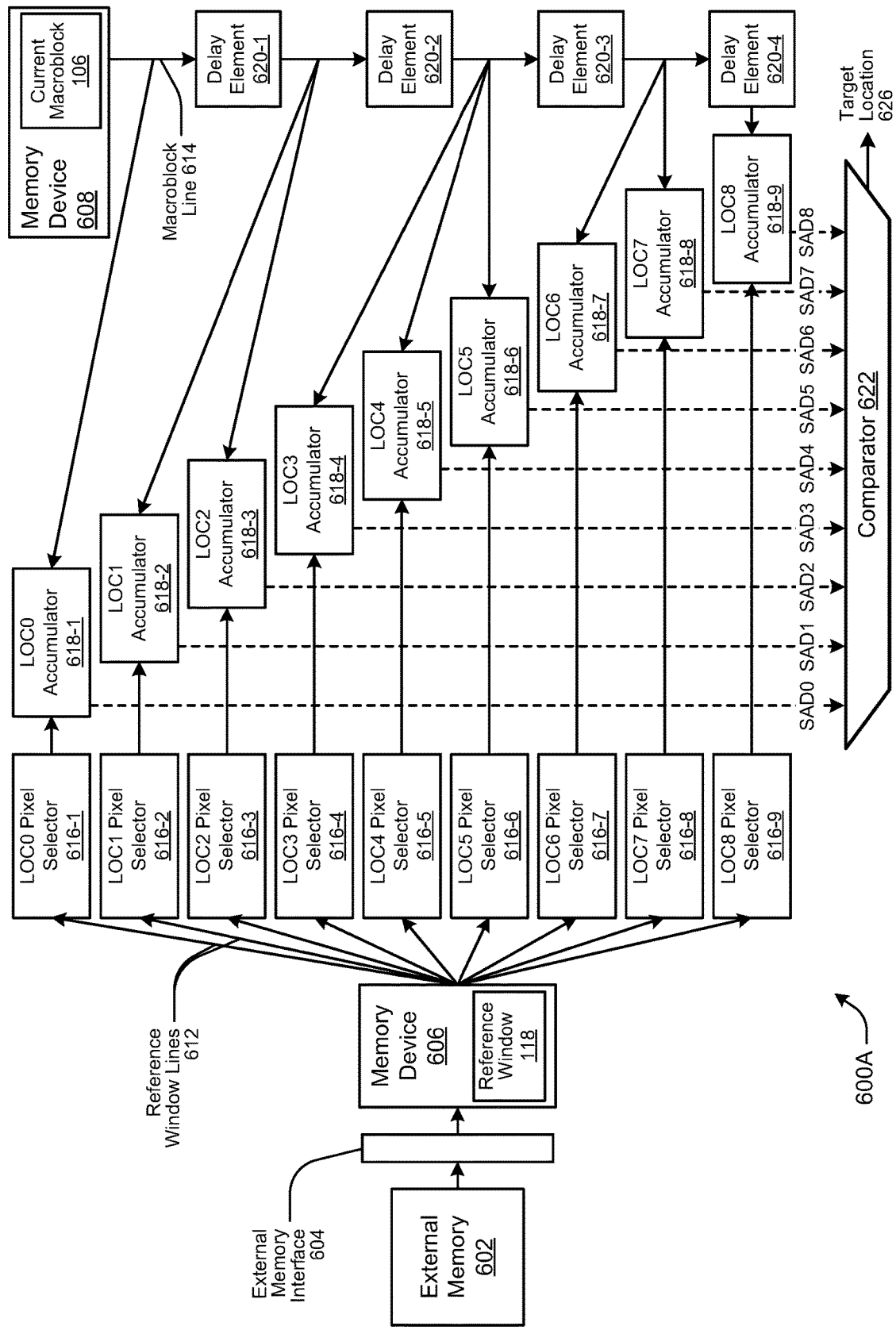
FIGS. 6A-6D illustrate various examples of hardware implementations for performing motion searches using the search patterns illustrated in FIGS. 5A-5D, respectively.

FIG. 6A illustrates a system 600A and hardware implementation for performing a motion search using the search pattern illustrated in FIG. 5A. As illustrated, LOC0 accumulator (e.g., accumulator 618-1) receives macroblock line 614 directly from memory device 608 without any applied delays. LOC1 and LOC2 accumulators receive macroblock line 614 with one clock delay (applied by delay element 620-1). This is because when Line 1 of reference window 118 is read, LOC1 and LOC2 accumulators need Line 0 of current macroblock 106. LOC3, LOC4, and LOC5 accumulators receive macroblock line 614 with 2 clock delays (applied by delay elements 620-1 and 620-2). This is because when Line 2 of reference window 118 is read, $LOC_3$, LOC4, and LOC5 accumulators need Line 0 of current macroblock 106. LOC6 and LOC7 accumulators receive macroblock line 614 with three clock delays (applied by delay elements 620-1, 620-2, and 620-3). This is because when Line 3 of reference window 118 is read, LOC6 and LOC7 accumulators need Line 0 of current macroblock 106. LOC8 accumulator receives macroblock line 614 with four clock delays (applied by delay elements 620-1, 620-2, 620-3, and 620-4). This is because when Line 4 of reference window 118 is read, LOC8 accumulator needs Line 0 of current macroblock 106.

When reference window lines 612 are read from memory device 606, the lines are sent to pixel selectors 616 before being sent to their respective accumulators 618. The pixels that are selected depend on the corresponding location. In one example, LOC0 pixel selector selects 16 pixels starting from pixel 2, LOC1 pixel selector selects 16 pixels starting from pixel 1, LOC2 pixel selector selects 16 pixels starting from pixel 3, LOC3 pixel selector selects 16 pixels starting from pixel 0, LOC4 pixel selector selects 16 pixels starting from pixel 2, LOC5 pixel selector selects 16 pixels starting from pixel 3, LOC6 pixel selector selects 16 pixels starting from pixel 1, LOC7 pixel selector selects 16 pixels starting from pixel 3, and LOC8 pixel selector selects 16 pixels starting from pixel 2.

With these shifted versions of reference window lines 612 and delayed versions of macroblock line 614, the control logic just has to read the reference window lines and macroblock lines once per iteration, as will be further shown in FIG. 7. As the lines are read, corresponding accumulators 618 are accumulating SAD values in parallel. After all lines are read, accumulators 618 are ready with the SAD values corresponding to the locations under consideration. These are compared by comparator 622 and a best location (which may be referred to as a target location 626) is picked based on the minimum SAD. This process is repeated for the next iteration of the search but the center location is updated as target location 626 from the previous iteration.

Figure 6B:
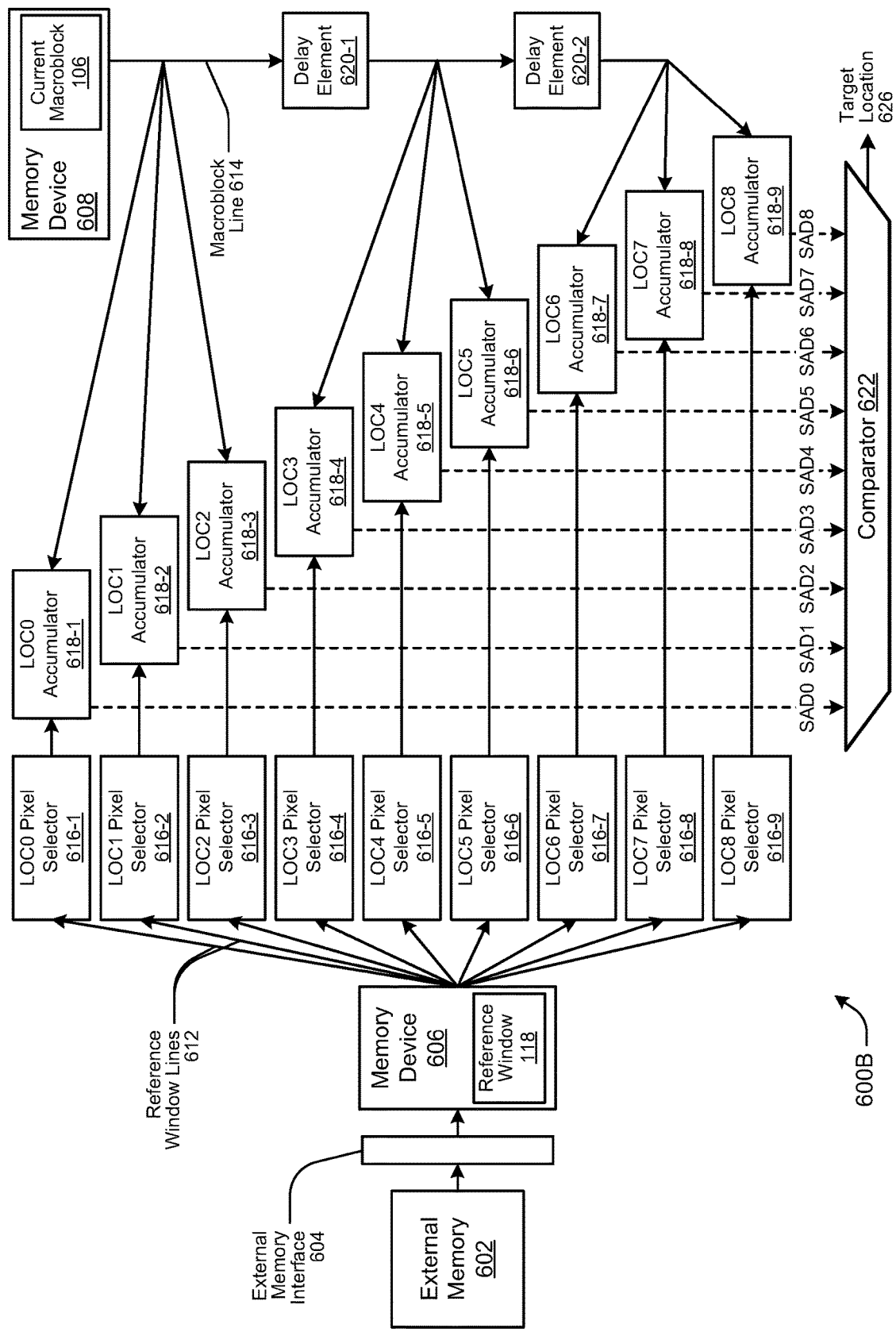

FIG. 6B illustrates a system 600B and hardware implementation for performing a motion search using the search pattern illustrated in FIG. 5B. System 600B differs from system 600A as follows. LOC0, LOC1, and LOC2 accumulators receive macroblock line 614 directly from memory device 608 without any applied delays. LOC3, LOC4, and LOC5 accumulators receive macroblock line 614 with one clock delay (applied by delay element 620-1). LOC6, LOC7, and LOC8 accumulators receive macroblock line 614 with 2 clock delays (applied by delay elements 620-1 and 620-2).

Figure 6C:
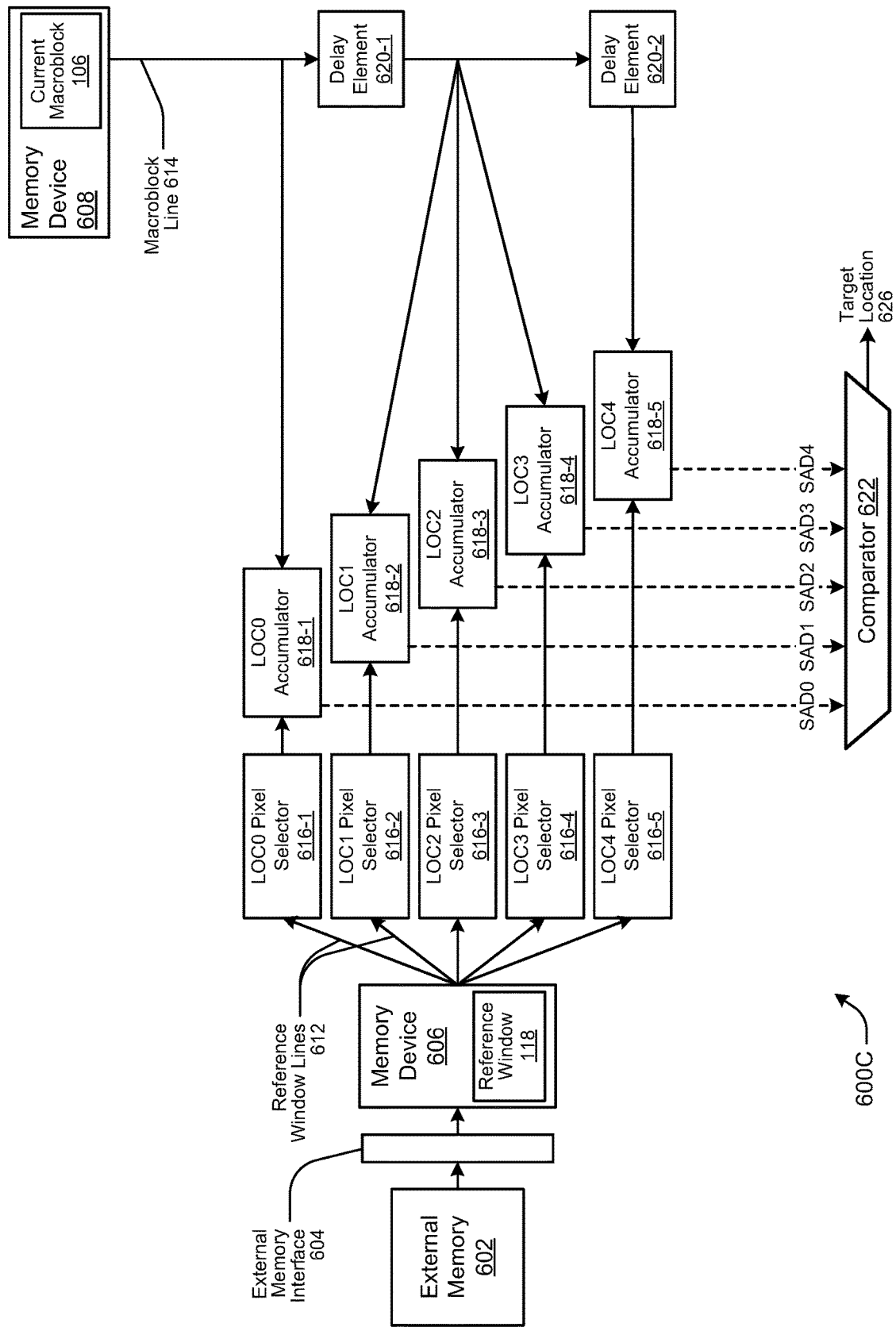

FIG. 6C illustrates a system 600C and hardware implementation for performing a motion search using the search pattern illustrated in FIG. 5C. System 600C differs from system 600A as follows. LOC0 accumulator receives macroblock line 614 directly from memory device 608 without any applied delays. LOC1, LOC2, and LOC3 accumulators receive macroblock line 614 with one clock delay (applied by delay element 620-1). LOC4 accumulator receives macroblock line 614 with 2 clock delays (applied by delay elements 620-1 and 620-2).

Figure 6D:
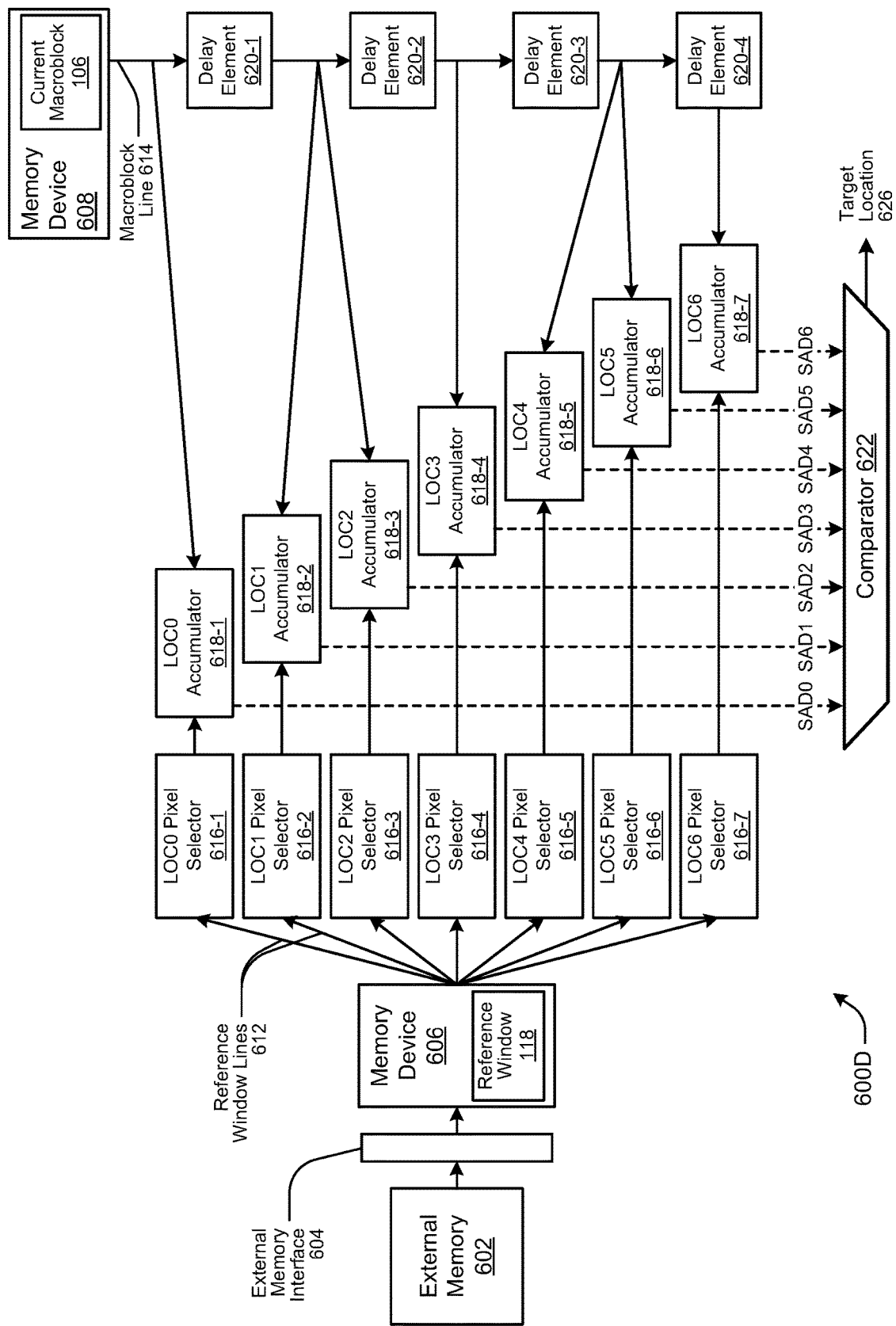

FIG. 6D illustrates a system 600D and hardware implementation for performing a motion search using the search pattern illustrated in FIG. 5D. System 600D differs from system 600A as follows. LOC0 accumulator receives macroblock line 614 directly from memory device 608 without any applied delays. LOC1 and LOC2 accumulators receive macroblock line 614 with one clock delay (applied by delay element 620-1). LOC3 accumulator receives macroblock line 614 with 2 clock delays (applied by delay elements 620-1 and 620-2). LOC4 and LOC5 accumulators receive macroblock line 614 with three clock delays (applied by delay elements 620-1, 620-2, and 620-3). LOC6 accumulator receives macroblock line 614 with four clock delays (applied by delay elements 620-1, 620-2, 620-3, and 620-4).

In various embodiments, systems 600 can be configured to perform full-pixel or sub-pixel searches. In some instances, the different types of motion searches can be performed by modifying the type of data that is stored in memory device 606 for reference window 118, as well as by modifying the pixel pitch. For full-pel searches, the pixels for reference window 118 are read from reference frame 104 and are stored in memory device 606. For half-pel, quarter-pel, or ⅛-pel searches, the pixels are subjected to interpolation prior to storage in memory device 606.

FIG. 7 illustrates a table 700 showing the order of reference window lines 612 and macroblock lines 614 being sent to accumulators 618, corresponding to the example described in FIGS. 5A and 6A. As shown, at Clock 0 (e.g., a first clock cycle), Window Line 0 (e.g., reference window line 612) and MBlk Line 0 (e.g., macroblock line 614) are sent only to LOC0 accumulator, since LOC0 accumulator is the only accumulator that requires Window Line 0. At Clock 1, Window Line 1 is sent to each of LOC0, LOC1, and LOC2 accumulators and MBlk Line 1 is sent to LOC0 accumulator. Also at Clock 1, MBlk Line 0, which was delayed by delay element 620-1 between Clock 0 and Clock 1, is sent to LOC1, and LOC2 accumulators.

At Clock 2, Window Line 2 is sent to each of LOC0, LOC1, LOC2, LOC3, LOC4, and LOC5 accumulators and MBlk Line 2 is sent to LOC0 accumulator. Also at Clock 1, MBlk Line 1, which was delayed by delay element 620-1 between Clock 1 and Clock 2, is sent to LOC1, and LOC2 accumulators. Also at Clock 2, MBlk Line 0, which was delayed by delay element 620-1 between Clock 0 and Clock 1 and by delay element 620-2 between Clock 1 and Clock 2, is sent to LOC3, LOC4, and LOC5 accumulators. This process continues in a similar manner until all reference window lines from Window Line 0 to Window Line 19 and all macroblock lines from MBlk Line 0 to MBlk Line 15 have been sent to accumulators 618.

In some embodiments, latency can be further reduced by processing more than one line per clock cycle. This can be accomplished by modifying the SRAM width and the accumulator data path width. For example, at Clock 0, Window Line 0 may be sent to LOC0 accumulator and Window Line 1 may be sent to LOC0, LOC1, and LOC2 accumulators. Also at Clock 0, MBlk Line 0 may be sent to LOC0, LOC1, and LOC2 accumulators and MBlk Line 1 may be sent to LOC0 accumulator.

Figure 8:
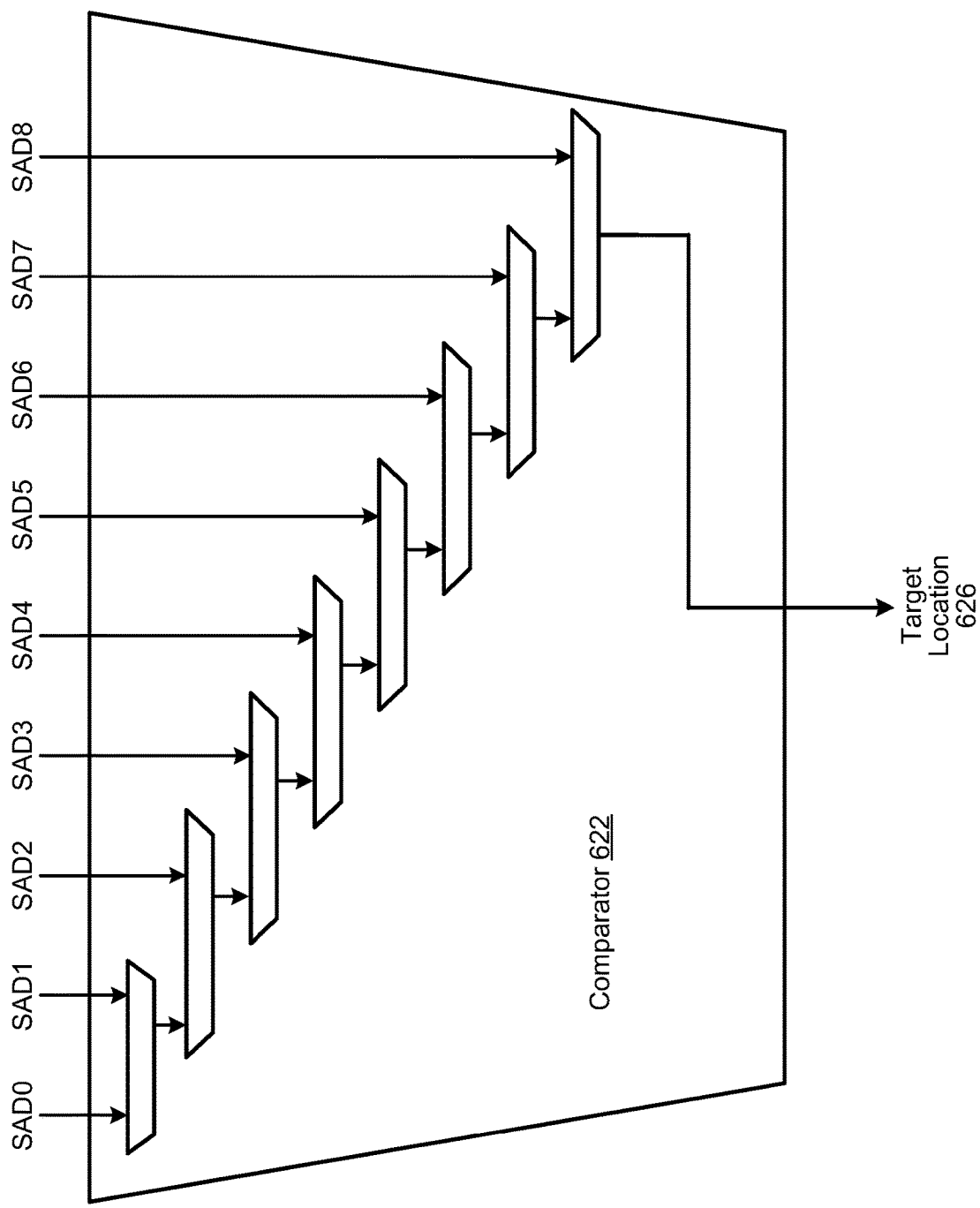
FIG. 8 illustrates an example of a comparator that employs sequential pairwise comparisons.

FIG. 8 illustrates an example of comparator 622 that employs sequential pairwise comparisons between SAD values as they become available. As shown in FIG. 7, accumulators 618 may finish receiving reference window lines 612 and macroblock lines 614 at different clock cycles from each other. For example, LOC0 accumulator is finished receiving lines at Clock 15, LOC1 and LOC2 accumulators are finished receiving lines at Clock 16, LOC3, LOC4, and LOC5 accumulators are finished receiving lines at Clock 17, LOC6 and LOC1 accumulators are finished receiving lines at Clock 18, and LOC8 accumulator is finished receiving lines at Clock 19. As such, accumulators 618 may compute final SAD values at different clock cycles from each other, in a similar order.

Comparator 622 may be designed to take advantage of the sequential availability of final SAD values by performing cascading pairwise comparisons of the final SAD values in the order that they become available. In the illustrated embodiment, a pairwise comparison between SAD0 and SAD1 is first performed and the minimum SAD value between the two is computed. Next, a pairwise comparison is performed between the minimum SAD and SAD2, resulting in a new minimum SAD. Next, a pairwise comparison is performed between the new minimum SAD and SAD3. This process continues in a similar manner until a final minimum SAD is determined and its corresponding target location 626 is outputted by comparator 622. For example, if the final minimum SAD is SAD4, then the output of comparator 622 may provide an indication that LOC4 is target location 626 and/or the value of SAD4.

Figure 9:
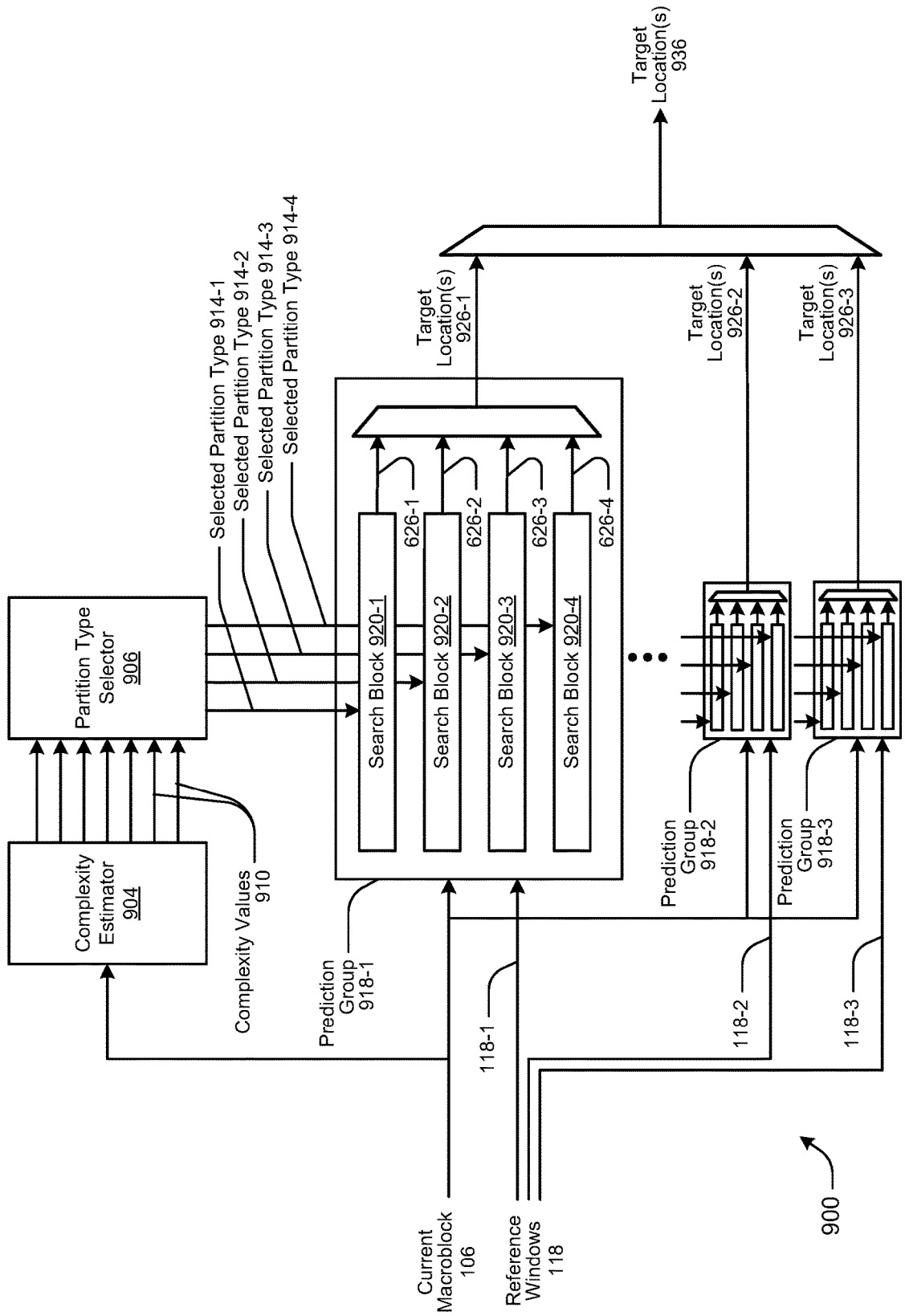
FIG. 9 illustrates an example system and hardware implementation for performing a motion search using complexity-based selection of partition types.

FIG. 9 illustrates an example system 900 and hardware implementation for performing a motion search using complexity-based selection of partition types. One or more components of systems 600 may be incorporated into one or more components of system 900. For example, each of search blocks 920 may include one or more pixel selectors 616, accumulators 618, delay elements 620, etc., for enabling the determination of a motion vector between current macroblock 106 and reference window 118.

In the illustrated embodiment, current macroblock 106 and reference windows 118 may be provided as inputs to system 900. Reference windows 118 may include multiple reference windows, which may correspond to different portions of reference frame 104 and/or portions of different reference frames 104. For example, a first reference window 118-1 may be obtained from a reference frame that precedes current frame 102, a second reference window 118-2 may be obtained from a reference frame that follows current frame 102, and a third reference frame 118-3 may be obtained from the same reference frame as first reference window 118-1. Reference windows 118-1, 118-2, and 118-3 are provided to prediction groups 918-1, 918-2, and 918-3 respectively.

Current macroblock 106 may be provided to each of prediction groups 918 as well as to complexity estimator 904, which generates a set of complexity values 910 for the various partition types. Partition type selector 906 may determine which partition types should be searched based on complexity values 910, and provide selected partition types 914 to search blocks 920 within prediction groups 918. In some embodiments, partition type selector 906 may provide the same selected partition types 914 to each of prediction groups 918. In some embodiments, the quantity of selected partition types 914 (e.g., 4) is equal to a quantity of search blocks 920 in each of prediction groups 918. The quantity of selected partition types 914 may also be less than the quantity of search blocks 920 if only a few of the partition types satisfy certain criteria.

One or more target locations 626 are generated by each of search blocks 920 based on the corresponding partition type. For example, if selected partition type 914-1 indicates an 8×8 partition type, search block 920-1 may generate 4 target locations 626-1. As another example, if selected partition type 914-2 indicates a 4×4 partition type, search block 920-2 may generate 16 target locations 626-2. As another example, if selected partition type 914-3 indicates a 16×16 partition type, search block 920-3 may generate 1 target location 626-3. For each of prediction groups 918, target locations 626 (and/or the similarity scores associated with target locations 626) may be combined into target location(s) 926, which may include target locations 626 having preferable prediction errors and/or computational costs. Thereafter, target locations 926 (and/or the similarity scores associated with target locations 926) may be combined into target location(s) 936, which may include target locations 926 having preferable prediction errors and/or computational costs.

Figure 10:
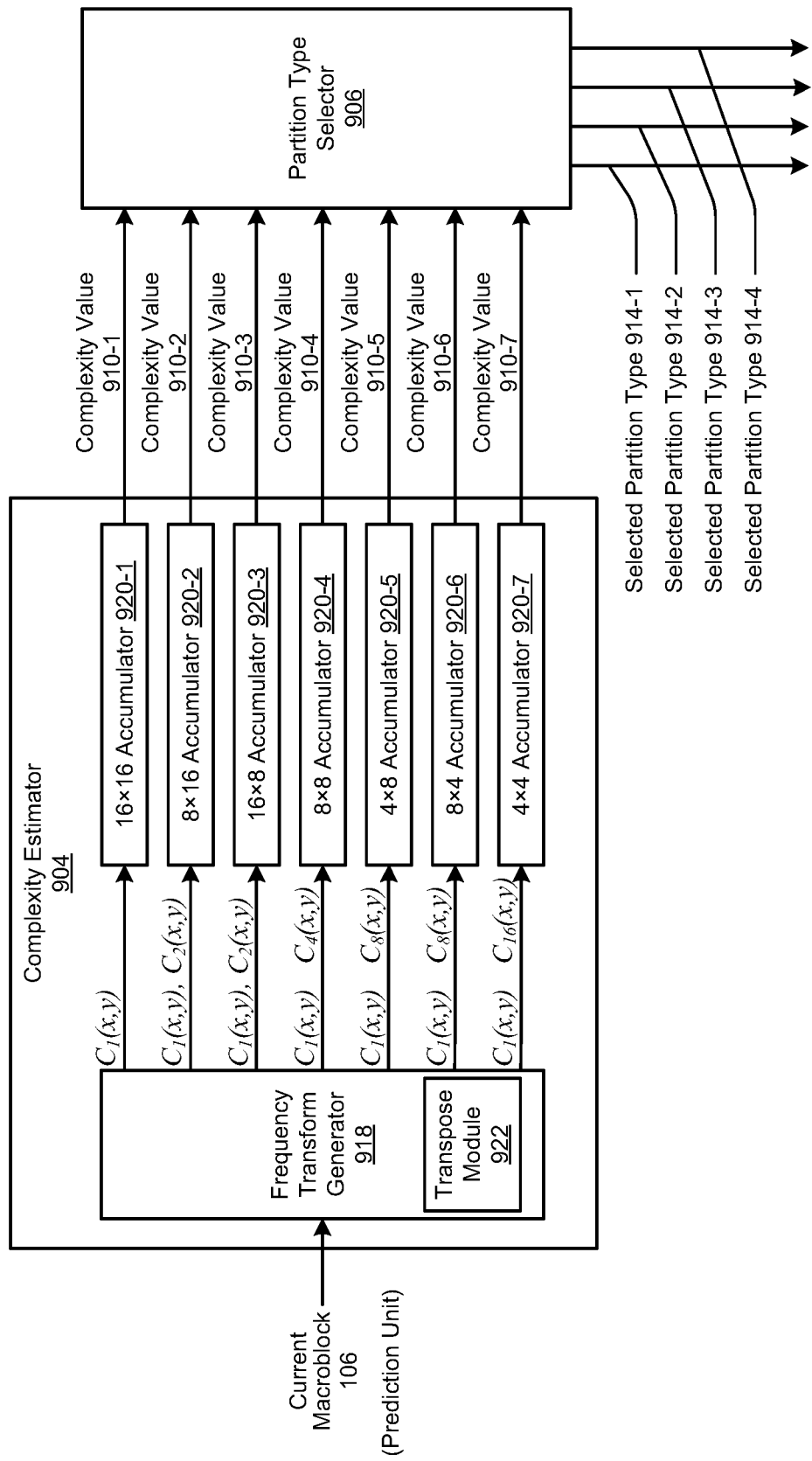
FIG. 10 illustrates an example complexity estimator and partition type selector.

FIG. 10 illustrates an example complexity estimator 904 and partition type selector 906. Complexity is measured per partition type and for each partition. If a partition type has multiple partitioned blocks, the complexity of each is accumulated (because each partitioned block goes through a motion search independently and there may be no relationship between partitioned blocks). If the codec supports 16×16, 8×16, 16×8, 8×8, 4×8, 8×4, and 4×4 partition types, complexity may be measured for the entire partition for each of these partition types. For each partition type, the complexity may be measured using a 2D integer discrete cosine transform (DCT) to generate a coefficients matrix and by computing the weighted sum of the coefficients by their x and y coordinates.

The equation for complexity for every partition type can be expressed as $$\text{Complexity} = \sum_{p=1}^{N} \sum_{x=1}^{W} \sum_{y=1}^{H} C_p(x, y) * x * y$$

where p is the partitioned block index, N is the quantity of partitioned blocks for the partition type, x is the X coordinate of the partitioned block, W is the width of the partitioned block, y is the Y coordinate of the partitioned block, H is the height of the partitioned block, and $C_p(x,y)$ is the coefficients matrix for the partitioned block, which is outputted by the 2D transform. In some embodiments, the dimensions of $C_p(x,y)$ is the same as the dimensions of the partitioned block. For example, the dimensions of $C_p(x,y)$ may be 16×16 for a 16×16 partition type, 8×16 for an 8×16 partition type, 16×8 for a 16×8 partition type, and the like.

Example values of W, H, and N are shown in the following table for each of the partition types.

| Partition Type | W | H | N |
|---|---|---|---|
| 16 × 16 | 16 | 16 | 1 |
| 8 × 16 | 8 | 16 | 2 |
| 16 × 8 | 16 | 8 | 2 |
| 8 × 8 | 8 | 8 | 4 |
| 4 × 8 | 4 | 8 | 8 |
| 8 × 4 | 8 | 4 | 8 |
| 4 × 4 | 4 | 4 | 16 |

In some embodiments, complexity estimator 904 may include a frequency transform generator 918 and a set of accumulators 920. In some embodiments, complexity estimator 904 may perform one or more frequency transforms on current macroblock 106. In some embodiments, the frequency transforms may result in coefficients matrices $C_p(x,y)$ that are provided to accumulators 920. For example, for a 16×16 partition type, frequency transform generator 918 may generate a single coefficients matrix $C_1(x,y)$ based on the entire current macroblock 106 and may provide the matrix to accumulator 920-1. For an 8×16 partition type, frequency transform generator 918 may generate a first coefficients matrix $C_1(x,y)$ corresponding to a first 8×16 partitioned block and a second coefficients matrix $C_2(x,y)$ corresponding to a second 8×16 partitioned block and provide the matrices to accumulator 920-2.

Frequency transform generator 918 may directly perform a 2D transform or, in some embodiments, may perform two 1D transforms. In such embodiments, frequency transform generator 918 may perform a first 1D transform of the partitioned block in a first direction (e.g., along the X axis), transpose the partitioned block (e.g., using a transpose module 922), and perform a second 1D transform of the partitioned block again in the first direction.

| Partition Type | $1^{st}$ DCT | $2^{nd}$ DCT |
|---|---|---|
| 16 × 16 | 16-point DCT | 16-point DCT |
| 8 × 16 | 8-point DCT | 16-point DCT |

-continued

| Partition Type | 1st DCT | 2nd DCT |
| --- | --- | --- |
| 16 × 8 | 16-point DCT | 8-point DCT |
| 8 × 8 | 8-point DCT | 8-point DCT |
| 4 × 8 | 4-point DCT | 8-point DCT |
| 8 × 4 | 8-point DCT | 4-point DCT |
| 4 × 4 | 4-point DCT | 4-point DCT |

Accumulators 920 may be configured to compute complexity values 910 by accumulating complexity subvalues for each coefficients matrix $C_p(x,y)$ that is received. For example, for an 8×16 partition type, accumulator 920-2 may compute a first complexity subvalue based on a first coefficients matrix $C_1(x,y)$ corresponding to a first 8×16 partitioned block and a second complexity subvalue based on a second coefficients matrix $C_2(x,y)$ corresponding to a second 8×16 partitioned block. Accumulator 920-2 may then compute complexity value 910-2 by summing the first complexity subvalue and the second complexity subvalue.

Figure 11:
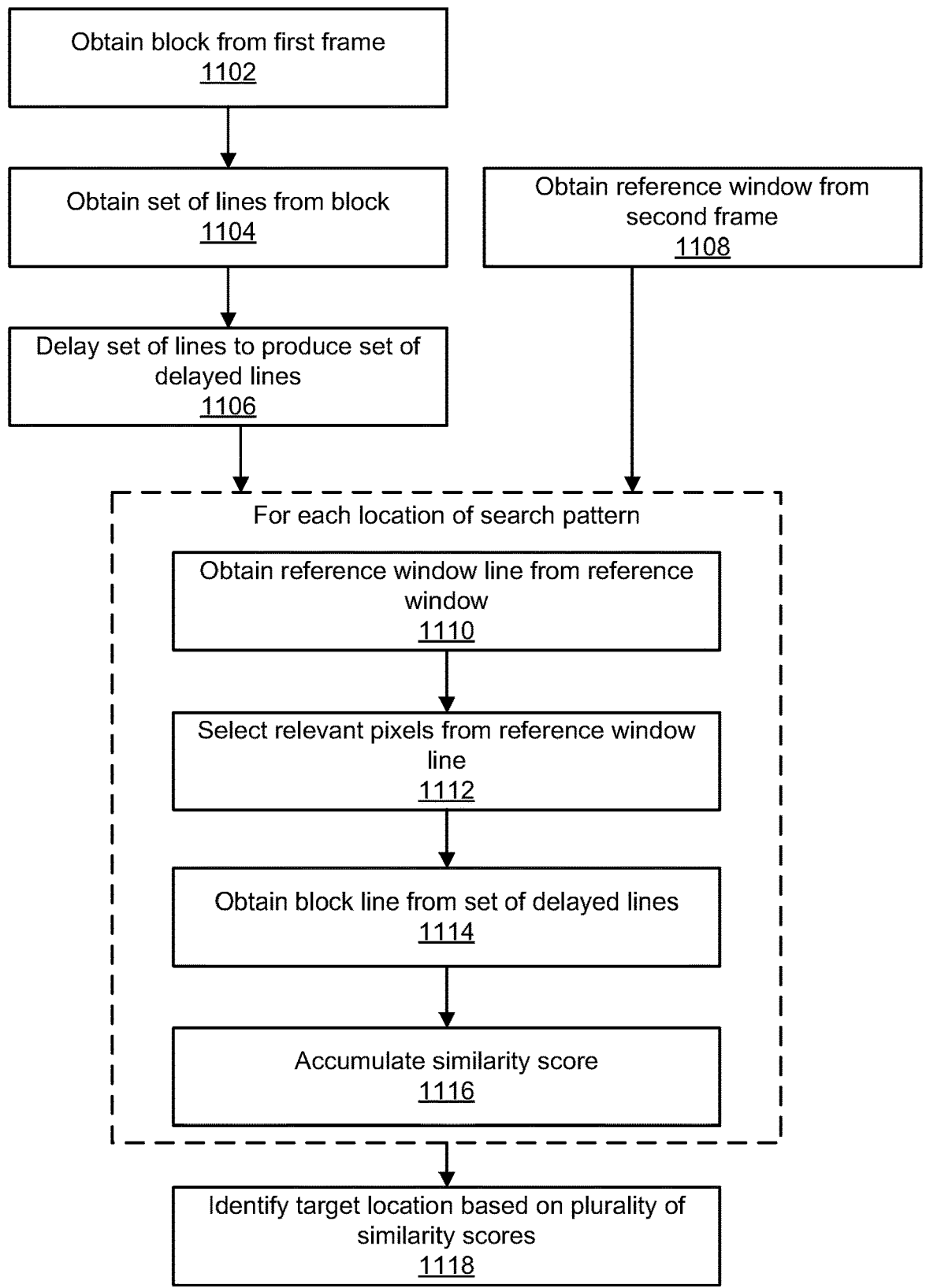
FIG. 11 illustrates a method of determining a motion vector between two frames.

FIG. 11 illustrates an example method 1100 of determining a motion vector between two frames. One or more steps of method 1100 may be performed in a different order than the illustrated embodiment, and one or more steps of method 1100 may be omitted during performance of method 1100. In some embodiments, one or more steps of method 1100 may be performed by one or more components of systems 600. In some embodiments, one or more steps of method 1100 may be performed by a processor communicatively coupled to memory devices 602, 606, and/or 608. In some embodiments, a non-transitory computer-readable medium may be provided that stores instructions that, when executed by one or more processors, cause the one or more processors to configure a field-programmable gate array (FPGA) to perform method 1100.

At step 1102, a block, such as a macroblock (e.g., current macroblock 106), is obtained from a first frame (e.g., current frame 102). The block may include a 2D array of pixels from the first frame. In some embodiments, the block may be retrieved from an external memory (e.g., external memory 602) via an external memory interface (e.g., external memory interface 604). In some embodiments, the block is stored in one or more memory devices (e.g., memory devices 606 and 608).

At step 1104, a set of lines (e.g., macroblock line 614) are obtained from the block. In some embodiments, the set of lines are obtained from the memory device. In some embodiments, the set of lines are obtained at different clock cycles. In one example, a first line may be obtained at a first clock cycle, a second line may be obtained at a second clock cycle after the first clock cycle, and a third line may be obtained at a third clock cycle after the second clock cycle.

At step 1106, the set of lines are delayed to produce a set of delayed lines. In some embodiments, the set of lines are delayed using a set of delay elements (e.g., delay elements 620). In one example, at a particular clock cycle, a first line may be delayed using a first delay element (e.g., delay element 620-1) and a second delay element (e.g., delay element 620-2), a second line may be delayed using the first delay element, and a third line may not be delayed. In some embodiments, each of the set of lines are available to be read by or sent to a plurality of accumulators (e.g., accumulators 618).

At step 1108, a reference window (e.g., reference window 118) is obtained from a second frame (e.g., reference frame 104). In some embodiments, the reference window may be retrieved from the external memory via the external memory interface. In some embodiments, the reference window may be stored in the one or more memory devices.

In some embodiments, steps 1110 to 1116 are performed for each location of a search pattern (e.g., search patterns 500) comprising a plurality of locations (e.g., locations 112). In some embodiments, the plurality of locations are arranged in a set of rows and a set of columns.

At step 1110, a reference window line (e.g., reference window lines 612) is obtained from the reference window. In some embodiments, the reference window line is obtained from the one or more memory devices. In some embodiments, the reference window line is sent to one of a plurality of pixel selectors (e.g., pixel selectors 616).

At step 1112, relevant pixels are selected from the reference window line. In some embodiments, the relevant pixels are selected by one of the plurality of pixel selectors. In some embodiments, a quantity of the plurality of pixel selectors is equal to a quantity of the plurality of locations (e.g., N). In some embodiments, the relevant pixels are selected based on which column of the set of columns the location belongs.

At step 1114, a block line (e.g., macroblock line 614) is obtained from the set of delayed lines. In some embodiments, the block line is obtained from the set of delayed lines based on which row of the set of rows the location belongs. In one example, the block line may be a third line that is not delayed if the location belongs to a top/first row of the search pattern, a once delayed second line if the location belongs to a second row of the search pattern, or a twice delayed first line if the location belongs to a third row of the search pattern.

At step 1116, a similarity score (e.g., SAD) of a plurality of similarity scores (e.g., SAD0, SAD1, SADN) is accumulated based on the reference window line and the block line. In some embodiments, the similarity score is accumulated by one of a plurality of accumulators (e.g., accumulators 618). In some embodiments, a quantity of the plurality of accumulators is equal to the quantity of the plurality of locations. In some embodiments, accumulating the similarity score may include computing a SAD value between the block line (or the relevant values of the block line) and the reference window line, and adding the SAD value to the similarity score to track a running total of computed SAD values.

At step 1118, a target location (e.g., target location 626) is identified based on the plurality of similarity scores. In some embodiments, the plurality of similarity scores are compared and the target location is identified based on the comparison. In some embodiments, the plurality of similarity scores are compared to identify a maximum similarity score (e.g., if the similarity score is proportional to similarity) or a minimum similarity score (e.g., if the similarity score is proportional to dissimilarity, such as the SAD metric), and the target location is determined to correspond to the maximum similarity score or minimum similarity score. In some embodiments, the plurality of similarity scores are compared using a comparator (e.g., comparator 622). In some embodiments, a motion vector (e.g., motion vectors 110) is determined based on the target location and a location (e.g., location 116) of the block.

Figure 12:
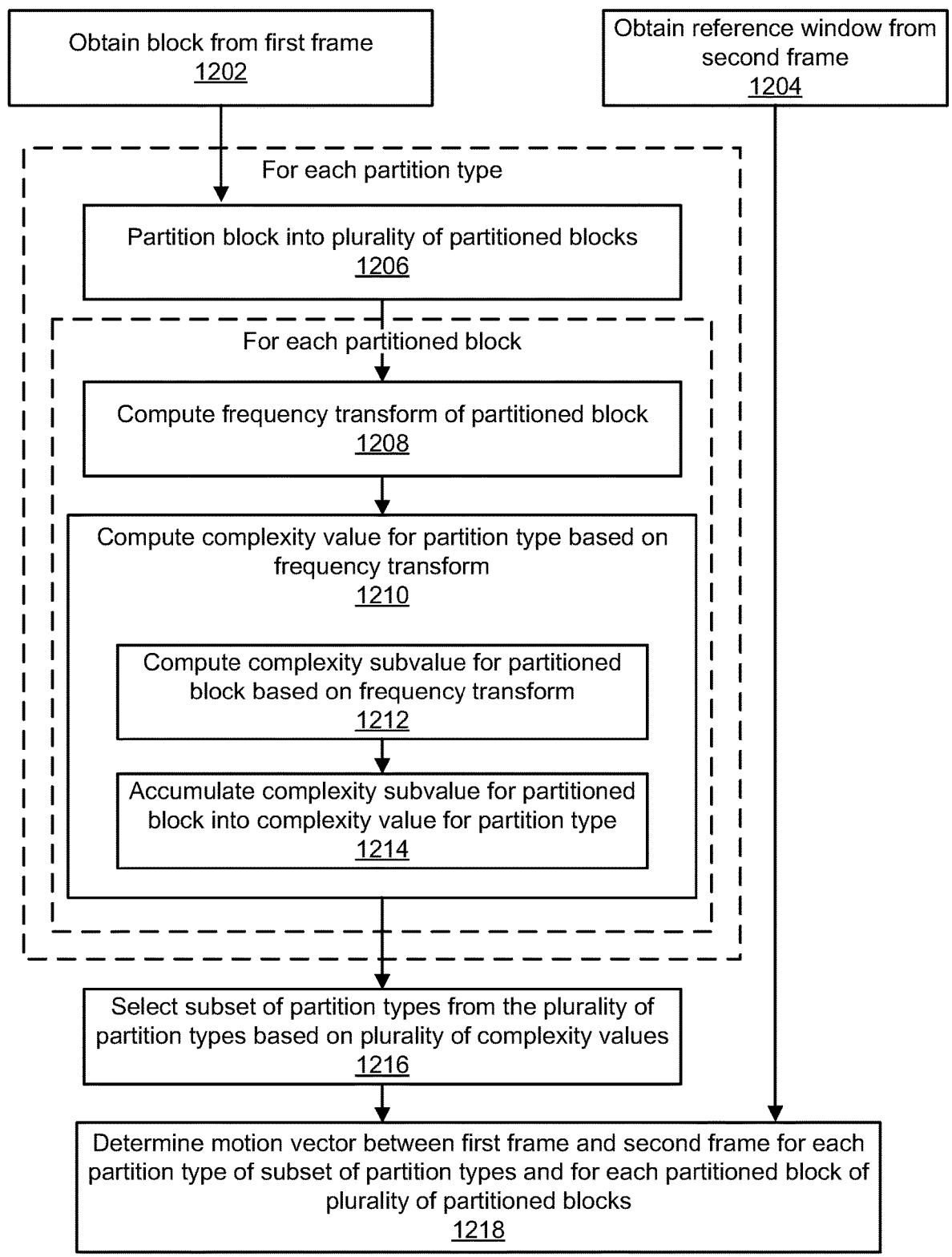
FIG. 12 illustrates an example method of performing a motion search based on an estimated complexity of a macroblock.

FIG. 12 illustrates an example method 1200 of performing a motion search based on an estimated complexity of a block. One or more steps of method 1200 may be performed in a different order than the illustrated embodiment, and one or more steps of method 1200 may be omitted during performance of method 1200. In some embodiments, one or more steps of method 1200 may be performed by one or more components of systems 600. In some embodiments, one or more steps of method 1200 may be performed by a processor communicatively coupled to memory devices 602, 606, and/or 608. In some embodiments, a non-transitory computer-readable medium may be provided that stores instructions that, when executed by one or more processors, cause the one or more processors to configure a field-programmable gate array (FPGA) to perform method 1200.

At step 1202, a block, such as a macroblock (e.g., current macroblock 106), is obtained from a first frame (e.g., current frame 102). The block may include a 2D array of pixels from the first frame. In some embodiments, the block may be retrieved from an external memory (e.g., external memory 602) via an external memory interface (e.g., external memory interface 604). In some embodiments, the block is stored in one or more memory devices (e.g., memory devices 606 and 608).

At step 1204, a reference window (e.g., reference window 118) is obtained from a second frame (e.g., reference frame 104). In some embodiments, the reference window may be retrieved from the external memory via the external memory interface. In some embodiments, the reference window may be stored in the one or more memory devices.

In some embodiments, steps 1206 to 1214 are performed for each partition type of a plurality of partition types. For example, if the plurality of partition types includes 7 partition types, then steps 1206 to 1214 may be performed 7 times.

At step 1206, the block is partitioned into a plurality of partitioned blocks in accordance with the partition type. In some embodiments, steps 1208 to 1214 are performed for each partitioned block of the plurality of partitioned blocks. For example, if the plurality of partitioned blocks includes 16 partitioned blocks (e.g., 4×4 partition type), then steps 1208 to 1214 may be performed 16 times.

At 1208, a frequency transform of the partitioned block is computed. In some embodiments, computing the frequency transform of the partitioned block includes performing a DCT of the partitioned block. In some embodiments, performing the DCT of the partitioned block includes performing a 2D DCT of the partitioned block. In some embodiments, performing the DCT of the partitioned block includes performing a first 1D DCT of the partitioned block in a first direction, transposing the partitioned block, and performing a second 1D DCT of the partitioned block in the first direction. In some embodiments, performing the DCT of the partitioned block includes generating a coefficients matrix (e.g., $C_p(x,y)$). In some embodiments, the coefficients matrix may have the same dimensions as the partitioned block. For example, if the partitioned block has dimensions of 4×8, then the coefficients matrix may also have dimensions of 4×8.

At step 1210, a complexity value (e.g., complexity value 910) for the partition type is computed (e.g., originally generated and/or updated) based on the frequency transform. For example, for a first partitioned block of the plurality of partitioned blocks, the complexity value may be originally generated based on the frequency transform of the first partitioned block. For subsequent partitioned blocks, the complexity value may be updated/modified based on the frequency transforms of the subsequent partitioned blocks. The complexity value for the partition type may be one of a plurality of complexity values (e.g., complexity values 910). In some embodiments, step 1210 may include one or both of steps 1212 and 1214.

At step 1212, a complexity subvalue for the partitioned block is computed based on the frequency transform. The complexity subvalue for the partitioned block may represent the partitioned block's contribution to the complexity value for the partition type. The complexity subvalue may be summed with other complexity subvalues to compute the complexity value.

At step 1214, the complexity subvalue is accumulated into the complexity value for the partition type. In some embodiments, accumulating the complexity subvalue into the complexity value may include initializing the complexity value to the complexity subvalue (for the first partitioned block) or adding the complexity subvalue to the complexity value (for any subsequent partitioned block).

At step 1216, a subset of partition types (e.g., selected partition types 914) are selected from the plurality of partition types based on the plurality of complexity values. In some embodiments, the subset of partition types are selected based on which partition types have the lowest complexity values. For example, in some embodiments, the 1, 2, 3, or 4 partition types that have the lowest complexity values may be selected. In some embodiments, any partition type that has a complexity value below a threshold is selected.

In some embodiments, the computation cost associated with each partition type is determined and is additionally used to select the subset of partition types. In some embodiments, the subset of partition types are selected based on which partition types have the lowest complexity values and also satisfy a computation budget. For example, the quantity of partition types selected may depend on the computation costs of the partition types having the lowest complexity values. For example, 3 partition types having the lowest complexity values may only be selected if also selecting a $4^{th}$ partition type causes the computation budget to be exceeded. The computation cost associated with a partition type may be related to the amount of data that needs to be included for decoding. For example, partition types with more partitioned blocks may have greater computation costs than partition types with fewer partitioned blocks.

At step 1218, a motion vector (e.g., motion vectors 110) between the first frame and the second frame is determined for each partition type of the subset of partition types and for each partitioned block of the plurality of partitioned blocks. For example, if the subset of partition types includes 4 partition types that include 1, 2, 4, and 16 partitioned blocks, then 23 motion vectors may be determined. In some embodiments, additional motion vectors may be determined if a search pattern (e.g., search patterns 500) is employed and/or if a multiple-iteration motion search is performed. In some embodiments, the motion vector may be determined between the block of the first frame and the reference window of the second frame.

Figure 13:
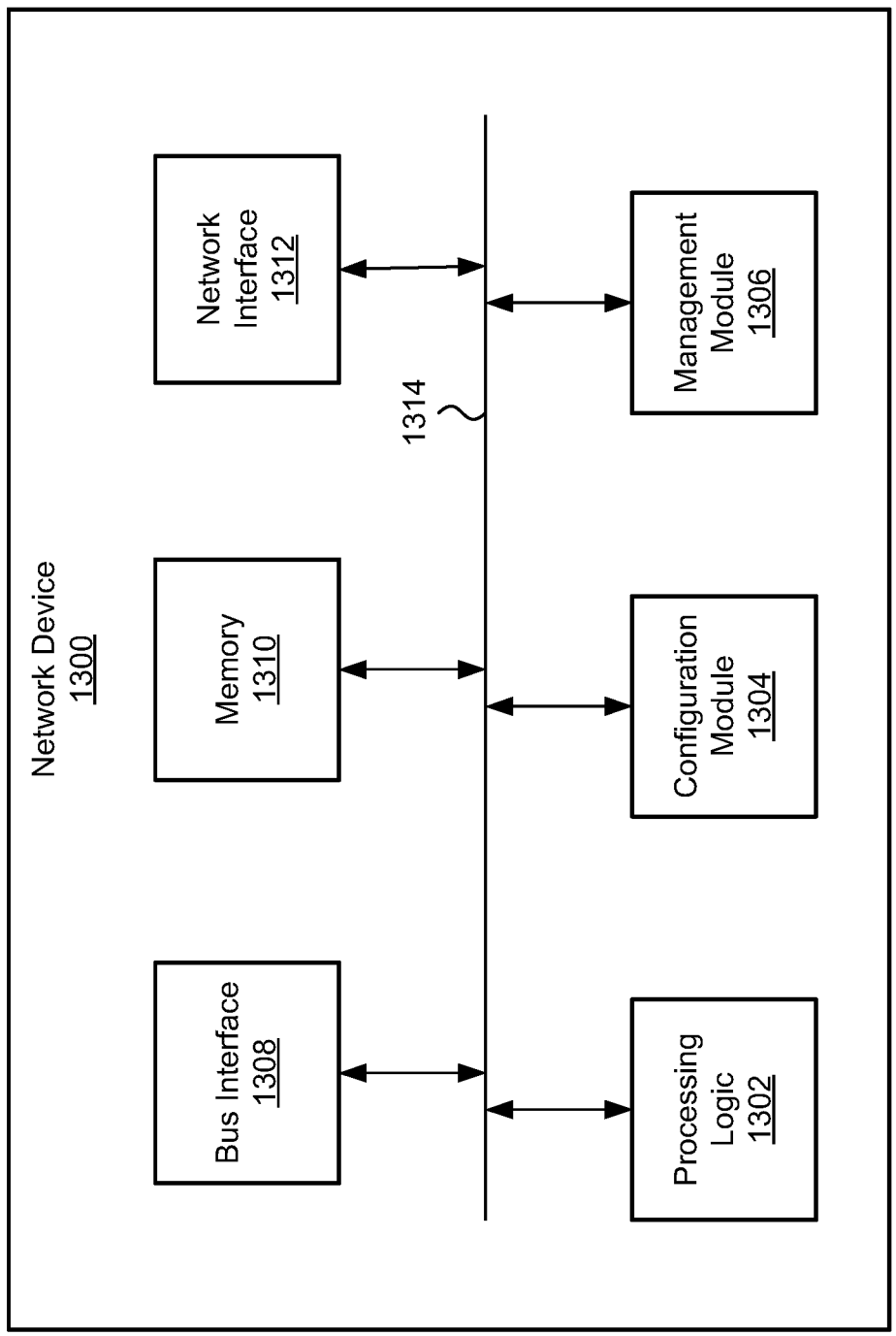
FIG. 13 illustrates an example of a network device, according to certain aspects of the disclosure.

FIG. 13 illustrates an example of a network device 1300. Functionality and/or several components of the network device 1300 may be used without limitation with other embodiments disclosed elsewhere in this disclosure, without limitations. A network device 1300 may facilitate processing of packets and/or forwarding of packets from the network device 1300 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1300 may be the recipient and/or generator of packets. In some implementations, the network device 1300 may modify the contents of the packet before forwarding the packet to another device. The network device 1300 may be a peripheral device coupled to another computer device, a switch, a router or any other suitable device enabled for receiving and forwarding packets.

In one example, the network device 1300 may include processing logic 1302, a configuration module 1304, a management module 1306, a bus interface module 1308, memory 1310, and a network interface module 1312. These modules may be hardware modules, software modules, or a combination of hardware and software. In certain instances, modules may be interchangeably used with components or engines, without deviating from the scope of the disclosure. The network device 1300 may include additional modules, not illustrated here, such as components discussed with respect to the nodes disclosed in FIG. 14. In some implementations, the network device 1300 may include fewer modules. In some implementations, one or more of the modules may be combined into one module. One or more of the modules may be in communication with each other over a communication channel 1314. The communication channel 1314 may include one or more busses, meshes, matrices, fabrics, a combination of these communication channels, or some other suitable communication channel.

The processing logic 1302 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1302 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1302 may be stored on a computer-readable storage medium, for example, in the form of a computer program. The computer-readable storage medium may be non-transitory. In some cases, the computer-readable medium may be part of the memory 1310.

The memory 1310 may include either volatile or non-volatile, or both volatile and non-volatile types of memory. The memory 1310 may, for example, include random access memory (RAM), read only memory (ROM), Electrically Erasable Programmable Read-Only Memory (EEPROM), flash memory, and/or some other suitable storage media. In some cases, some or all of the memory 1310 may be internal to the network device 1300, while in other cases some or all of the memory may be external to the network device 1300. The memory 1310 may store an operating system comprising executable instructions that, when executed by the processing logic 1302, provides the execution environment for executing instructions providing networking functionality for the network device 1300. The memory may also store and maintain several data structures and routing tables for facilitating the functionality of the network device 1300.

In some implementations, the configuration module 1304 may include one or more configuration registers. Configuration registers may control the operations of the network device 1300. In some implementations, one or more bits in the configuration register can represent certain capabilities of the network device 1300. Configuration registers may be programmed by instructions executing in the processing logic 1302, and/or by an external entity, such as a host device, an operating system executing on a host device, and/or a remote device. The configuration module 1304 may further include hardware and/or software that control the operations of the network device 1300.

In some implementations, the management module 1306 may be configured to manage different components of the network device 1300. In some cases, the management module 1306 may configure one or more bits in one or more configuration registers at power up, to enable or disable certain capabilities of the network device 1300. In certain implementations, the management module 1306 may use processing resources from the processing logic 1302. In other implementations, the management module 1306 may have processing logic similar to the processing logic 1302, but segmented away or implemented on a different power plane than the processing logic 1302.

The bus interface module 1308 may enable communication with external entities, such as a host device and/or other components in a computing system, over an external communication medium. The bus interface module 1308 may include a physical interface for connecting to a cable, socket, port, or other connection to the external communication medium. The bus interface module 1308 may further include hardware and/or software to manage incoming and outgoing transactions. The bus interface module 1308 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1308 may include the physical layer for any of these bus protocols, including a connector, power management, and error handling, among other things. In some implementations, the network device 1300 may include multiple bus interface modules for communicating with multiple external entities. These multiple bus interface modules may implement the same local bus protocol, different local bus protocols, or a combination of the same and different bus protocols.

The network interface module 1312 may include hardware and/or software for communicating with a network. This network interface module 1312 may, for example, include physical connectors or physical ports for wired connection to a network, and/or antennas for wireless communication to a network. The network interface module 1312 may further include hardware and/or software configured to implement a network protocol stack. The network interface module 1312 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1300 may include multiple network interface modules, each configured to communicate with a different network. For example, in these implementations, the network device 1300 may include a network interface module for communicating with a wired Ethernet network, a wireless 802.11 network, a cellular network, an Infiniband network, etc.

The various components and modules of the network device 1300, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 14.

Figure 14:
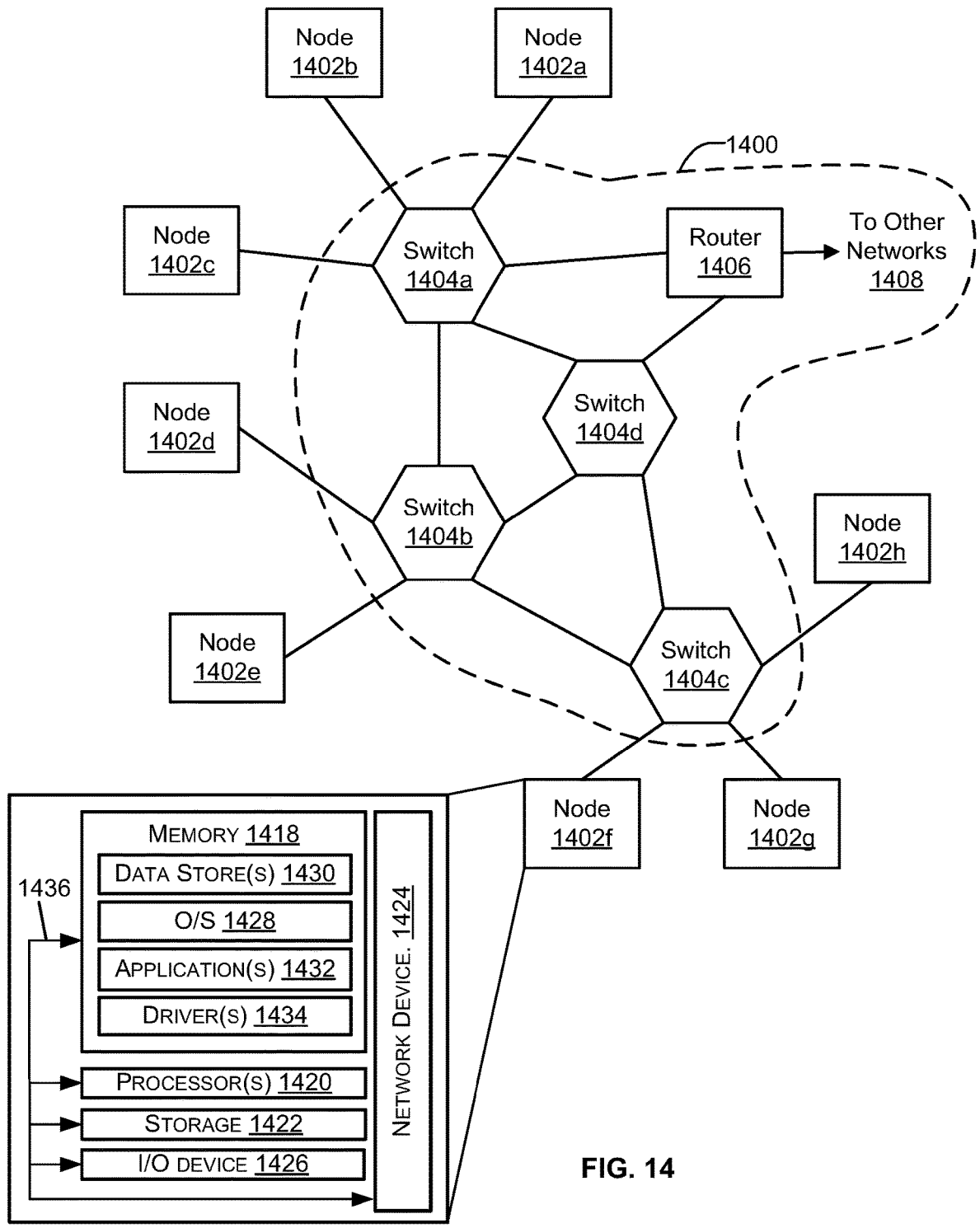
FIG. 14 illustrates an example architecture for features and systems described herein that includes one or more service provider computers and/or a user device connected via one or more networks, according to certain aspects of the disclosure.

FIG. 14 illustrates a network 1400, illustrating various different types of network devices 1300 of FIG. 13, such as nodes comprising the network device, switches and routers. In certain embodiments, the network 1400 may be based on a switched architecture with point-to-point links. As illustrated in FIG. 14, the network 1400 includes a plurality of switches 1404a-1404d, which may be arranged in a network. In some cases, the switches are arranged in a multi-layered network, such as a Clos network. A network device 1300 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1404a-1404d may be connected to a plurality of nodes 1402a-1402h and provide multiple paths between any two nodes.

The network 1400 may also include one or more network devices 1300 for connection with other networks 1408, such as other subnets, LANs, wide area networks (WANs), or the Internet, and may be referred to as routers 1406. Routers use headers and forwarding tables to determine the best path for forwarding the packets, and use protocols such as internet control message protocol (ICMP) to communicate with each other and configure the best route between any two devices.

In some examples, network(s) 1400 may include any one or a combination of many different types of networks, such as cable networks, the Internet, wireless networks, cellular networks and other private and/or public networks. Interconnected switches 1404a-1404d and router 1406, if present, may be referred to as a switch fabric, a fabric, a network fabric, or simply a network. In the context of a computer network, terms "fabric" and "network" may be used interchangeably herein.

Nodes 1402a-1402h may be any combination of host systems, processor nodes, storage subsystems, and I/O chassis that represent user devices, service provider computers or third party computers.

User devices may include computing devices to access an application 1432 (e.g., a web browser or mobile device application). In some aspects, the application 1432 may be hosted, managed, and/or provided by a computing resources service or service provider. The application 1432 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a net-book computer, a desktop computer, a thin-client device, a tablet computer, an electronic book (e-book) reader, a gaming console, etc. In some examples, the user device(s) may be in communication with the service provider computer(s) via the other network(s) 1408. Additionally, the user device(s) may be part of the distributed system managed by, controlled by, or otherwise part of the service provider computer(s) (e.g., a console device integrated with the service provider computers).

The node(s) of FIG. 14 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1432 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1402a-1402h may include at least one memory 1418 and one or more processing units (or processor(s) 1420). The processor(s) 1420 may be implemented in hardware, computer-executable instructions, firmware, or combinations thereof. Computer-executable instruction or firmware implementations of the processor(s) 1420 may include computer-executable or machine-executable instructions written in any suitable programming language to perform the various functions described.

In some instances, the hardware processor(s) 1420 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1418 may store program instructions that are loadable and executable on the processor(s) 1420, as well as data generated during the execution of these programs. Depending on the configuration and type of the node(s) 1402a-1402h, the memory 1418 may be volatile (such as RAM) and/or non-volatile (such as ROM, flash memory, etc.). The memory 1418 may include an operating system 1428, one or more data stores 1430, one or more application programs 1432, one or more drivers 1434, and/or services for implementing the features disclosed herein.

The operating system 1428 may support nodes 1402a-1402h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1428 may also be a proprietary operating system.

The data stores 1430 may include permanent or transitory data used and/or operated on by the operating system 1428, application programs 1432, or drivers 1434. Examples of such data include web pages, video data, audio data, images, user data, and so on. The information in the data stores 1430 may, in some implementations, be provided over the network(s) 1408 to user devices 1404. In some cases, the data stores 1430 may additionally or alternatively include stored application programs and/or drivers. Alternatively or additionally, the data stores 1430 may store standard and/or proprietary software libraries, and/or standard and/or proprietary application user interface (API) libraries. Information stored in the data stores 1430 may be machine-readable object code, source code, interpreted code, or intermediate code.

The drivers 1434 include programs that may provide communication between components in a node. For example, some drivers 1434 may provide communication between the operating system 1428 and additional storage 1422, network device 1424, and/or I/O device 1426. Alternatively or additionally, some drivers 1434 may provide communication between application programs 1432 and the operating system 1428, and/or application programs 1432 and peripheral devices accessible to the service provider computer. In many cases, the drivers 1434 may include drivers that provide well-understood functionality (e.g., printer drivers, display drivers, hard disk drivers, Solid State Device drivers). In other cases, the drivers 1434 may provide proprietary or specialized functionality.

The service provider computer(s) or servers may also include additional storage 1422, which may include removable storage and/or non-removable storage. The additional storage 1422 may include magnetic storage, optical disks, solid state disks, flash memory, and/or tape storage. The additional storage 1422 may be housed in the same chassis as the node(s) 1402a-1402h or may be in an external enclosure. The memory 1418 and/or additional storage 1422 and their associated computer-readable media may provide non-volatile storage of computer-readable instructions, data structures, program modules, and other data for the computing devices. In some implementations, the memory 1418 may include multiple different types of memory, such as SRAM, DRAM, or ROM.

The memory 1418 and the additional storage 1422, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1418 and the additional storage 1422 are examples of computer storage media. Additional types of computer storage media that may be present in the node(s) 1402a-1402h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1402a-1402h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1402a-1402h may also include I/O device(s) 1426, such as a keyboard, a mouse, a pen, a voice input device, a touch input device, a display, speakers, a printer, and the like. The node(s) 1402a-1402h may also include one or more communication channels 1436. A communication channel 1436 may provide a medium over which the various components of the node(s) 1402a-1402h can communicate. The communication channel or channels 1436 may take the form of a bus, a ring, a switching fabric, or a network.

The node(s) 1402a-1402h may also contain network device(s) 1424 that allow the node(s) 1402a-1402h to communicate with a stored database, another computing device or server, user terminals and/or other devices on the network(s) 1400. The network device(s) 1424 of FIG. 14 may include similar components discussed with reference to the network device 1300 of FIG. 13.

In some implementations, the network device 1424 is a peripheral device, such as a PCI-based device. In these implementations, the network device 1424 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1308 may implement NVMe, and the network device 1424 may be connected to a computing system using a PCIe interface.

A PCI-based device may include one or more functions. A "function" describes operations that may be provided by the network device 1424. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1424 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 13, FIG. 14, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
    obtaining a block from a first frame;
    generating a plurality of complexity values corresponding to a plurality of partition types by:
        generating a macroblock coefficient matrix for the block and computing a first complexity value of the plurality of complexity values by accumulating coefficients of the macroblock coefficient matrix;
        for each partition type remaining in the plurality of partition types:
            partitioning the block into a plurality of partitioned blocks in accordance with the partition type;
            for each partitioned block of the plurality of partitioned blocks, generating a coefficient matrix for the partitioned block; and
            computing a complexity value for the partition type by accumulating coefficients of the coefficient matrices of the partitioned blocks for the partition type, wherein the complexity value is one of the plurality of complexity values for the plurality of partition types;

selecting a subset of partition types from the plurality of partition types based on the plurality of complexity values; and determining a motion vector between the first frame and a second frame for each partition type of the subset of partition types.

2. The method of claim 1, further comprising:

for each partition type of the plurality of partition types and for each partitioned block of the plurality of partitioned blocks:
   computing a frequency transform of the partitioned block, wherein the complexity value for the partition type is computed based on the frequency transform.

3. The method of claim 2, wherein the frequency transform is computed by performing a discrete cosine transform (DCT) of the partitioned block.

4. The method of claim 3, wherein performing the DCT of the partitioned block includes:
   performing a first one-dimensional (1D) DCT of the partitioned block in a first direction;
   transposing the partitioned block; and
   performing a second 1D DCT of the partitioned block in the first direction.

5. The method of claim 3, wherein the coefficients matrix has dimensions equal to the partitioned block.

6. The method of claim 1, wherein selecting a subset of partition types from the plurality of partition types based on the plurality of complexity values includes:
   determining that the complexity value for each of the subset of partition types is less than the complexity value for each partition type of the plurality of partition types that is not included in the subset of partition types.

7. The method of claim 6, wherein selecting a subset of partition types from the plurality of partition types based on the plurality of complexity values includes:
   determining that a computation cost for the subset of partition types is less than a computation budget.

8. The method of claim 1, wherein selecting a subset of partition types from the plurality of partition types based on the plurality of complexity values includes:
   determining that the complexity value for each of the subset of partition types is less than a threshold.

9. The method of claim 1, wherein the plurality of complexity values are computed respectively using a plurality of accumulators.

10. A non-transitory computer-readable medium comprising instructions that, when executed by one or more processors, cause the one or more processors to perform operations comprising:
    obtaining a block from a first frame;
    generating a plurality of complexity values corresponding to a plurality of partition types by:
       generating a macroblock coefficient matrix for the block and computing a first complexity value of the plurality of complexity values by accumulating coefficients of the macroblock coefficient matrix;
       for each partition type remaining in the plurality of partition types:
          partitioning the block into a plurality of partitioned blocks in accordance with the partition type;
          for each partitioned block of the plurality of partitioned blocks, generating a coefficient matrix for the partitioned block; and
          computing a complexity value for the partition type by accumulating coefficients of the coefficient matrices of the partitioned blocks for the partition type, wherein the complexity value is one of the plurality of complexity values for the plurality of partition types;
    selecting a subset of partition types from the plurality of partition types based on the plurality of complexity values; and
    determining a motion vector between the first frame and a second frame for each partition type of the subset of partition types.

11. The non-transitory computer-readable medium of claim 10, wherein the operations further comprise:
    for each partition type of the plurality of partition types and for each partitioned block of the plurality of partitioned blocks:
       computing a frequency transform of the partitioned block, wherein the complexity value for the partition type is computed based on the frequency transform.

12. The non-transitory computer-readable medium of claim 11, wherein the frequency transform is computed by performing a discrete cosine transform (DCT) of the partitioned block.

13. The non-transitory computer-readable medium of claim 12, wherein performing the DCT of the partitioned block includes:
    performing a first one-dimensional (1D) DCT of the partitioned block in a first direction;
    transposing the partitioned block; and
    performing a second 1D DCT of the partitioned block in the first direction.

14. The non-transitory computer-readable medium of claim 12, wherein the coefficients matrix has dimensions equal to the partitioned block.

15. The non-transitory computer-readable medium of claim 10, wherein selecting a subset of partition types from the plurality of partition types based on the plurality of complexity values includes:
    determining that the complexity value for each of the subset of partition types is less than the complexity value for each partition type of the plurality of partition types that is not included in the subset of partition types.

16. A non-transitory computer-readable medium storing instructions that, when executed by one or more processors, cause the one or more processors to configure a field-programmable gate array (FPGA) to perform operations comprising:
    obtaining a block from a first frame;
    generating a plurality of complexity values corresponding to a plurality of partition types by:
       generating a macroblock coefficient matrix for the block and computing a first complexity value of the plurality of complexity values by accumulating coefficients of the macroblock coefficient matrix;
       for each partition type remaining in the plurality of partition types:
          partitioning the block into a plurality of partitioned blocks in accordance with the partition type;
          for each partitioned block of the plurality of partitioned blocks, generating a coefficient matrix for the partitioned block; and
          computing a complexity value for the partition type by accumulating coefficients of the coefficient matrices of the partitioned blocks for the partition type, wherein the complexity value is one of the plurality of complexity values for the plurality of partition types;

selecting a subset of partition types from the plurality of partition types based on the plurality of complexity values; and determining a motion vector between the first frame and a second frame for each partition type of the subset of partition types.

* * * * *